(12) United States Patent
Saito et al.

(10) Patent No.: US 9,397,953 B2
(45) Date of Patent: Jul. 19, 2016

(54) OPERATION MANAGING METHOD FOR COMPUTER SYSTEM, COMPUTER SYSTEM AND COMPUTER-READABLE STORAGE MEDIUM HAVING PROGRAM THEREON

(75) Inventors: Kota Saito, Sunnyvale, CA (US); Yuji Mizote, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 494 days.

(21) Appl. No.: 13/820,710

(22) PCT Filed: Sep. 24, 2010

(86) PCT No.: PCT/JP2010/066516
§ 371 (c)(1),
(2), (4) Date: May 16, 2013

(87) PCT Pub. No.: WO2012/039053
PCT Pub. Date: Mar. 29, 2012

(65) Prior Publication Data
US 2013/0227144 A1    Aug. 29, 2013

(51) Int. Cl.
*G06F 15/173* (2006.01)
*H04L 12/911* (2013.01)
*G06F 9/50* (2006.01)

(52) U.S. Cl.
CPC .............. *H04L 47/70* (2013.01); *G06F 9/5072* (2013.01)

(58) Field of Classification Search
CPC .............................. G06F 9/4558; G06F 9/5016
USPC ........................... 709/223, 224, 226, 238, 229
See application file for complete search history.

(56) References Cited

U.S. PATENT DOCUMENTS

| | | | |
|---|---|---|---|
| 6,985,937 B1 * | 1/2006 | Keshav et al. | 709/223 |
| 2003/0217088 A1 | 11/2003 | Takamoto | |
| 2004/0003319 A1 | 1/2004 | Ukai et al. | |
| 2007/0067433 A1 * | 3/2007 | D'Alterio et al. | 709/223 |
| 2007/0234302 A1 * | 10/2007 | Suzuki et al. | 717/126 |

(Continued)

FOREIGN PATENT DOCUMENTS

| | | |
|---|---|---|
| JP | 2003-330740 A | 11/2003 |
| JP | 2004-030363 A | 1/2004 |
| JP | 2008-152594 A | 7/2008 |

(Continued)

OTHER PUBLICATIONS

English translation of WO2010024027 A1 provided by WIPO.*
International Search Report and Written Opinion on application PCT/JP2010/066516 mailed Nov. 22, 2010; 6 pages.

*Primary Examiner* — Liangche A Wang
*Assistant Examiner* — Kaylee Huang
(74) *Attorney, Agent, or Firm* — Foley & Lardner LLP

(57) ABSTRACT

In one embodiment according to the present invention, a virtual server collects the configuration information of a physical server being executed with granularity corresponding to the degree of operation verification defined in a business operation system including as a component the virtual server and stores it as checked and passed environmental information of the virtual server. When a new virtual server is allocated to the business operation system, a physical server group to which the virtual server is allocated is determined on the basis of the checked and passed environmental information of the virtual server. Hereby, a method of allocating resources enabling both the reliability guarantee of the business operation system and the cost reduction associated with operation check is realized.

18 Claims, 20 Drawing Sheets

(56) References Cited

U.S. PATENT DOCUMENTS

2007/0271560 A1* 11/2007 Wahlert et al. .................... 718/1
2008/0148015 A1    6/2008 Takamoto et al.

FOREIGN PATENT DOCUMENTS

| JP | 2008-293283 A | 12/2008 | |
| WO | WO2010024027 A1 * | 3/2010 | ................ G06F 9/50 |

\* cited by examiner

| OPERATION CHECK INDEX | DISPLAY ITEM | TO-BE-STORED ENVIRONMENT INFORMATION |
|---|---|---|
| S | CHECKING INCLUDING PHYSICAL SERVER IS NECESSARY | SERIAL NUMBER, HARDWARE MODEL NUMBER, HYPERVISOR TYPE |
| A | ONLY NEEDS TO CHECK WHETHER HARDWARE MODEL NUMBER AND HYPERVISOR ARE THE SAME | HARDWARE MODEL NUMBER, HYPERVISOR TYPE |
| B | ONLY NEEDS VIRTUAL SERVER-LEVEL CHECKING | HYPERVISOR TYPE |

*Fig. 3*

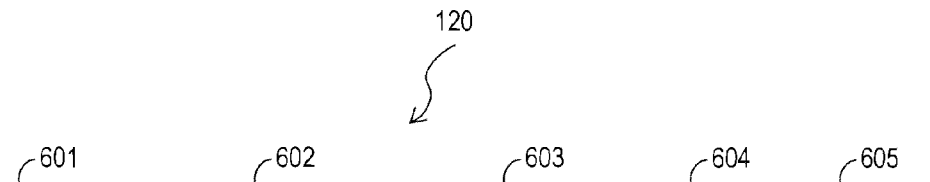

| INSTANCE NAME | VIRTUAL SERVER NAME | CPU CLOCK COUNT | PHYSICAL SERVER NAME | OPERATION CHECK USE |
|---|---|---|---|---|
| VM1 | SETTLEMENT SYSTEM SERVER | 2.0GHz | PHYSICAL SERVER 1 | N |
| VM2 | SETTLEMENT SYSTEM SERVER | 2.0GHz | PHYSICAL SERVER2 | N |
| VM3 | COLLABORATION SYSTEM SERVER | 2.0GHz | PHYSICAL SERVER1 | N |
| VM4 | COLLABORATION SYSTEM SERVER | 2.0GHz | PHYSICAL SERVER2 | N |
| VM5 | INTER-OFFICE PORTAL SERVER | 1.0GHz | PHYSICAL SERVER3 | Y |
| VM6 | INTER-OFFICE PORTAL SERVER | 1.0GHz | PHYSICAL SERVER3 | Y |

Fig. 6

| PHYSICAL SERVER NAME | SERIAL NUMBER | HARDWARE MODEL NUMBER | HYPERVISOR TYPE | CPU CLOCK COUNT | FREE CPU CLOCK COUNT | IP ADDRESS |
|---|---|---|---|---|---|---|
| PHYSICAL SERVER1 | AA-BB-01 | A1234 | HypervisorA | 4.0GHz | 0.0GHz | 10.1.2.11 |
| PHYSICAL SERVER2 | AA-BB-02 | A1234 | HypervisorA | 4.0GHz | 0.0GHz | 10.1.2.12 |
| PHYSICAL SERVER3 | AA-BB-03 | A1234 | HypervisorA | 4.0GHz | 2.0GHz | 10.1.2.13 |
| PHYSICAL SERVER4 | AA-BB-04 | B5678 | HypervisorA | 4.0GHz | 4.0GHz | 10.1.2.14 |

Fig. 7

| VIRTUAL SERVER NAME (801) | CHECKED AND PASSED ENVIRONMENT INFORMATION (802) |
|---|---|
| SETTLEMENT SYSTEM SERVER | SERIAL NUMBER= AA-BB-01, HARDWARE MODEL NUMBER = A1234, HYPERVISOR TYPE= HypervisorA |
| SETTLEMENT SYSTEM SERVER | SERIAL NUMBER= AA-BB-02, HARDWARE MODEL NUMBER = A1234, HYPERVISOR TYPE= HypervisorA |
| COLLABORATION SYSTEM SERVER | HARDWARE MODEL NUMBER = A1234, HYPERVISOR TYPE= HypervisorA |
| INTER-OFFICE PORTAL SERVER | HYPERVISOR TYPE= HypervisorA |

*Fig. 8*

OPERATION MANAGING METHOD FOR COMPUTER SYSTEM, COMPUTER SYSTEM AND COMPUTER-READABLE STORAGE MEDIUM HAVING PROGRAM THEREON

BACKGROUND OF THE INVENTION

This invention relates to an operation managing method for a computer system, a computer system, and a computer-readable medium having a program stored thereon. This invention is particularly suitable for application to an operation management server for allocating IT resources to a business operation system in a computer system where virtualization technology is introduced to integrate servers and other information technology (IT) resources to build a resource pool and allocate IT resources from the resource pool to one or more business operation systems.

With the burst of IT bubble and the worldwide recession of the last few years, an ever increasing demand for the reduction of investment cost and running cost related to IT is being made to information system departments of corporations. A technology that is attracting attention as one for attaining this object involves integrating servers, storage, networks, and other IT resources in a corporation or a data center into a resource pool by virtualization technology, and allocating IT resources as the need arises, thereby utilizing IT resources efficiently. An example of this technology is disclosed in Japanese Patent Application Laid-open No. 2008-293283 (Patent Literature 1).

The method of integrating IT resources to allocate the IT resources to a business operation system as the need arises has been, as described above, attracting attention as cloud computing in recent years, and the use of cloud computing is spreading. Cloud computing is implemented as a closed system confined to one corporation in some cases and, in other cases, a service provider who owns a mega data center for housing an enormous amount of IT resources provides IT resources to a plurality of corporations by cloud computing as a service business.

Patent Literature 1: Japanese Patent Application Laid-open No. 2008-293283

SUMMARY

When IT resources are integrated by virtualization technology, however, a virtualization layer separates a provider who manages a resource pool across corporations, or across business operation systems within a corporation, and allocates virtualized IT resources (hereinafter referred to as virtual resources) to a business operation system from an IT resource user who uses allocated virtual resources to build and run a business operation system.

Consequently, information on the physical aspect is hidden from the user and the user cannot grasp which virtual resource is run on which hardware resource (hereinafter referred to physical resource). This nature poses a problem in that, under conventional operation management, virtual resources from a resource pool cannot be allocated to a business operation system for which it is a common practice to secure the reliability of the business operation system by using physical resources that have been checked and passed an operation check for actual run, for example, mission-critical systems of banking-related corporations where high reliability is demanded. This is because there is no guarantee that virtual resources used for operation check and virtual resources used for actual run can be run on the same physical resource.

A possible solution to this problem is to secure the reliability of a business operation system by conducting an operation check on the business operation system for every physical resource in the resource pool. However, as cloud computing gains popularity, the number of physical resources constituting a resource pool and the number of business operation systems that use a resource pool become huge and conducting an operation check on every business operation system for every physical resource requires enormous cost.

An increase in the number of physical resources also means increased frequency of replacement due to the aging of or a failure in physical resources, and the need to conduct an operation check on all business operation systems each time requires enormous cost as well. Conducting an operation check on a business operation system for every physical resource is therefore not a practical method.

Another possible solution to the problem described above is to conduct an operation check on a business operation system each time virtual resources are allocated from the resource pool. However, the propagation of cloud computing makes it common to run business operation systems so that virtual resources are secured only when necessary and are returned when no longer necessary, unlike conventional systems where equipment needs to be kept for each business operation system separately all the time.

Specifically, for example, a business operation system which used thirty virtual resources yesterday may use twenty virtual resources today and forty virtual resources tomorrow, thus changing the business operation system configuration flexibly. Conducting an operation check each time virtual resources are allocated to a business operation system therefore requires enormous operation check cost, and this method, too, is impractical.

Still another possible solution is to build for each business operation system a resource pool in which physical resources that have been checked and passed an operation check are gathered, and allocate virtual resources to a business operation system from its associated resource pool. However, as already described, the number of business operation systems becomes huge with the propagation of cloud computing, which means enormous cost for the maintenance of resource pools.

Other factors that push up the maintenance cost than the huge number of business operation systems include the need to run a resource pool in a manner suited to the reliability of its associated business operation system because the standard by which a resource is deemed as having passed an operation check varies depending on how high reliability is demanded of a business operation system. For instance, in the case of replacing a physical resource that is included in a resource pool of a business operation system, some business operation systems need an operation check on resources including physical resources whereas other business operation systems only need an operation check on the virtual resource level.

While the former business operation systems need an operation check on the replacement physical resource, the latter business operation systems do not need one (as long as the same virtualization platform is used). In other words, even in the case of replacing a physical resource with an identical physical resource, what action is to be taken after replacement needs to be differentiated depending on how high reliability is demanded of the business operation system that includes the replacement physical resource as a component of the resource pool.

Building a resource pool for each business operation system separately thus requires resource pool maintenance for each and every one of a huge number of business operation systems that takes into account the reliability demanded of the business operation system, and results in enormous running cost.

In view of the problems described above, a resource allocation method is sought after that is capable of securing the reliability of a business operation system and reducing operation check-related cost both in a computer system where physical resources are integrated into a resource pool and virtual resources are allocated to one or more business operation systems.

An aspect of the invention is an operation managing method for a computer system that includes a management device and a physical computer group. The physical computer group includes a plurality of physical computers and each physical computer in the physical computer group executes a virtualization control program. The method includes: receiving, by the management device, an input indicating a virtual server to be allocated to a business operation system; obtaining, by the management device, from a checked and passed environment information storage area, checked and passed environment information which is generated as a result of an operation check of the virtual server on a physical computer in the physical computer group, the checked and passed environment information including a value of at least one configuration information item for identifying a configuration of a physical computer to which the virtual server is allocatable, the at least one configuration information item being specified with a value of an operation check index that is set for the virtual server; obtaining, by the management device, configuration information of each physical computer in the physical computer group from a configuration information storage area; and selecting, by the management device, from the physical computer group, a physical computer to which the virtual server is to be allocated based on the obtained checked and passed environment information and the obtained configuration information.

According to this invention, appropriate physical resources can be allocated efficiently to business operation systems of different levels of reliability in an environment where integrated IT resources can be shared by a plurality of business operation systems.

BRIEF DESCRIPTION OF THE DRAWINGS

FIG. 3 is a diagram illustrating an operation check index table according to the first embodiment.

FIG. 6 is a diagram illustrating an instance provision information table according to the first embodiment.

FIG. 7 is a diagram illustrating a physical server information table according to the first embodiment.

FIG. 8 is a diagram illustrating a checked and passed environment information table according to the first embodiment.

DETAILED DESCRIPTION OF THE EMBODIMENTS

First Embodiment

A first embodiment of this invention is described below. The first embodiment has a feature in that a virtual server, which is included in a business operation system, is provisioned in a physical server in a computer system where a plurality of physical servers integrated into one can be shared by a plurality of business operation systems. A operation management server of this embodiment determines a physical server in which a virtual server used for the actual running of a business operation system is to be provisioned based on information of an environment that is observed when a virtual server operation check is conducted on the business operation system (operation checked and passed environment information). Provisioning a virtual server of a business operation system in a physical server is hereinafter referred to as allocating a virtual server to a business operation system.

The operation checked and passed environment information includes the values of physical server configuration information items specified by an operation check index, and the values are obtained through operation check. The configuration information item values are for identifying the configuration of a physical server to which a virtual server can be allocated. The operation check index is set for (virtual servers of) each business operation system. The operation management server refers to the operation checked and passed environment information and physical server configuration information to identify a physical server to which a virtual server can be allocated.

<Outline of this Embodiment>

Figure 1A:
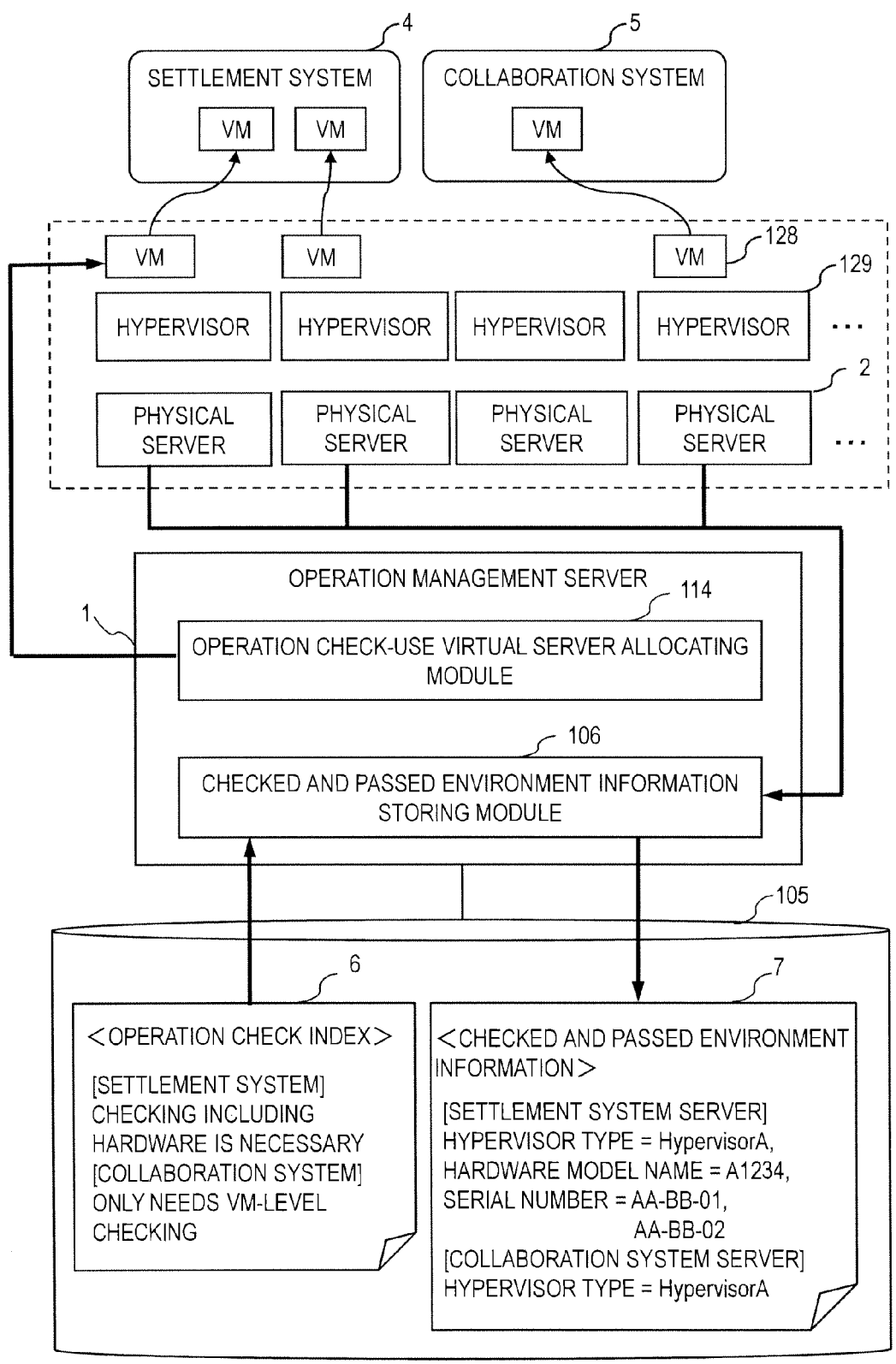
FIG. 1A is a diagram outlining processing of a checked and passed environment information storing module in a first embodiment.
Figure 1B:
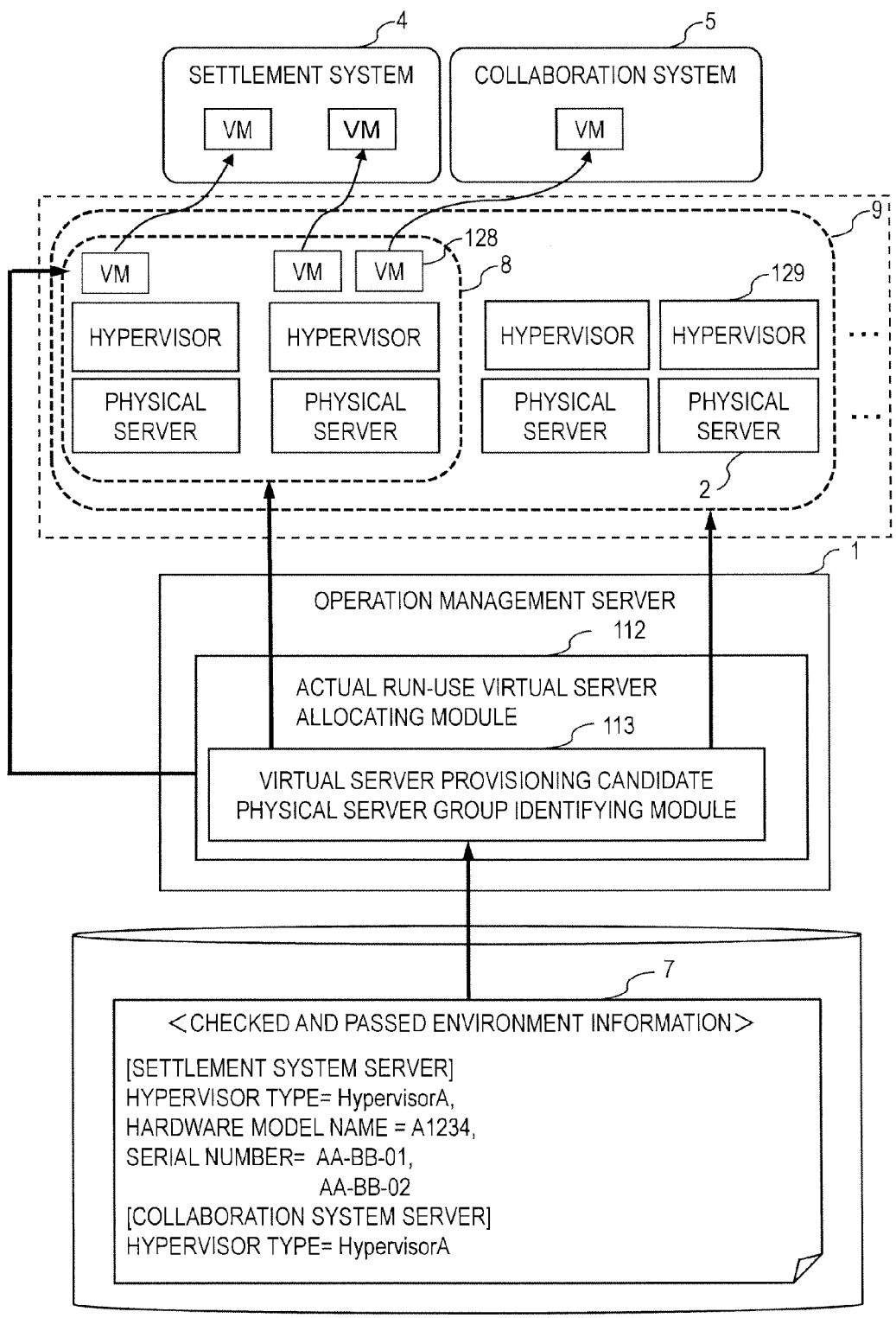
FIG. 1B is a diagram outlining processing of an actual run-use virtual server allocating module in the first embodiment.

FIGS. 1A and 1B are conceptual diagrams outlining this embodiment. Roughly two processing procedures are executed in this embodiment. The first processing involves allocating an operation check-use virtual server to a business operation system and storing information of an environment in which the virtual server is run. FIG. 1A is a diagram illustrating the first processing.

The second processing involves identifying, in order to allocate an actual run-use virtual server to a business operation system, a group of physical servers in which the virtual server can be provisioned based on the virtual server environment information which has been stored in the first processing, and provisioning the virtual server in one of the physical servers of the physical server group. FIG. 1B is a diagram illustrating the second processing.

FIG. 1A is described. First, an operation check-use virtual server allocating module 114 of an operation management server 1 allocates an operation check-use virtual server to a business operation system. FIG. 1A illustrates as examples of business operation systems a settlement system 4 and a collaboration system 5. In FIG. 1A, each virtual server is represented by a virtual machine (VM) 128, and two VMs 128 are allocated to the settlement system 4 whereas one VM 128 is allocated to the collaboration system 5. FIG. 1 use the reference symbol 128 to denote one VM as an example, and use "VM 128" for each different virtual server. The same notation method applies to hypervisors and physical servers.

A computer system of FIG. 1 includes a plurality of physical servers 2 and a hypervisor program 129 which operates on each physical server 2. The hypervisor program 129 is stored in a main storage device 126 (see FIG. 2B) of the physical server 2 and executes a virtual server, i.e., VM 128. FIG. 1A conceptually illustrates that a plurality of VMs 128 can be run on the physical servers 2 by showing the hypervisor programs 129 on top of the physical servers 2 and the VMs 128 on top of the hypervisor programs 129.

Next, a checked and passed environment information storing module 106 next collects from each physical server 2 information of an environment in which the relevant virtual server, i.e., VM 128, is run, and stores the information in a storage device as checked and passed environment information 7 of the virtual server. Environment information of each physical server 2 includes hardware configuration information and software configuration information of the physical server 2. What data is to be stored as the checked and passed environment information 7 varies depending on the degree of operation check of a business operation system which is defined by an operation check index 6.

The degree of operation check means how thorough an operation check is demanded in the actual run of a business operation system, for example, "checking including hardware is necessary" and "only needs VM-level checking", and varies from one business operation system to another.

For instance, in the operation check index 6 of FIG. 1A, the degree of operation check of the settlement system 4 is "checking including hardware is necessary". The storage device therefore stores, as the checked and passed environment information 7 of a settlement system server which constitutes the settlement system 4, information for identifying the physical servers 2 that have been checked and passed an operation check, namely, the serial number, the hardware model number, and the hypervisor type.

The degree of operation check of the collaboration system 5, on the other hand, is "only needs VM-level checking". The checked and passed environment information storing module 106 therefore determines that hardware configuration information of the physical servers 2 is not necessary as the checked and passed environment information 7 of a collaboration system server, which is included in the collaboration system 5, and this environment information 7 consists solely of the hypervisor type.

Details of the operation management server 1 are described with reference to FIG. 2. The operation check index 6 is simplified for illustration in FIG. 1A, and actually corresponds to an operation check index table 117 and a business operation information table 118, which are described with reference to FIG. 2. The checked and passed environment information 7, too, is simplified for illustration in FIG. 1A, and actually corresponds to a checked and passed environment information table 122, which is described with reference to FIG. 2.

FIG. 1B is described next. When an actual run-use virtual server allocating module 112 of the operation management server 1 allocates an actual run-use virtual server, a virtual server provisioning candidate physical server group identifying module 113 identifies a group of physical servers that are candidates for where the virtual server is to be allocated based on the checked and passed environment information 7 that has been stored through the processing described above with reference to FIG. 1A (a group of physical servers to which the virtual server can be allocated in the stored configuration). This is because physical servers that are deemed as having passed an operation check varies depending on what checked and passed environment information 7 has been stored.

For instance, the checked and passed environment information 7 of the settlement system server in the settlement system 4 is so detailed as to include the serial numbers and hardware model numbers of the physical servers 2, and only a group of physical servers 2 whose serial numbers and hardware model numbers match the included serial numbers and hardware model numbers can therefore be candidates for where the virtual server is to be allocated. The range thereof is indicated in FIG. 1B by a broken line that is denoted by a reference symbol 8. In the case of the collaboration system server in the collaboration system 5, on the other hand, the environment information 7 has only the hypervisor type, and every physical server 2 that has that type of hypervisor program 129 is therefore a candidate for where the virtual server is to be allocated. The range thereof is indicated in FIG. 1B by a broken line that is denoted by a reference symbol 9.

The operation management server 1 of this embodiment is capable of storing information of an environment that is observed in an operation check through the processing described above with reference to FIG. 1A, and further provisioning a virtual server in the physical server 2 that is deemed as having passed an operation check through the processing described above with reference to FIG. 1B. The need to conduct an operation check when provisioning a virtual server is thus eliminated.

A virtual server of the settlement system 4 and a virtual server of the collaboration system 5 can be provisioned in the physical server 2 that is included in both the broken-line range denoted by the reference symbol 8 and the broken-line range denoted by the reference symbol 9. In short, a physical server can be shared by a plurality of business operation systems. In addition, when the physical servers 2 in which a virtual server of the settlement system 4 can be provisioned do not have surplus resources, the operation management server 1 can secure surplus resources by relocating, based on the checked and passed environment information 7 that has been stored, a virtual server of the collaboration system 5 to a place that is outside of the broken-line range denoted by the reference symbol 8 and inside the broken-line range denoted by the reference symbol 9.

<Overall Configuration>

Figure 2A:
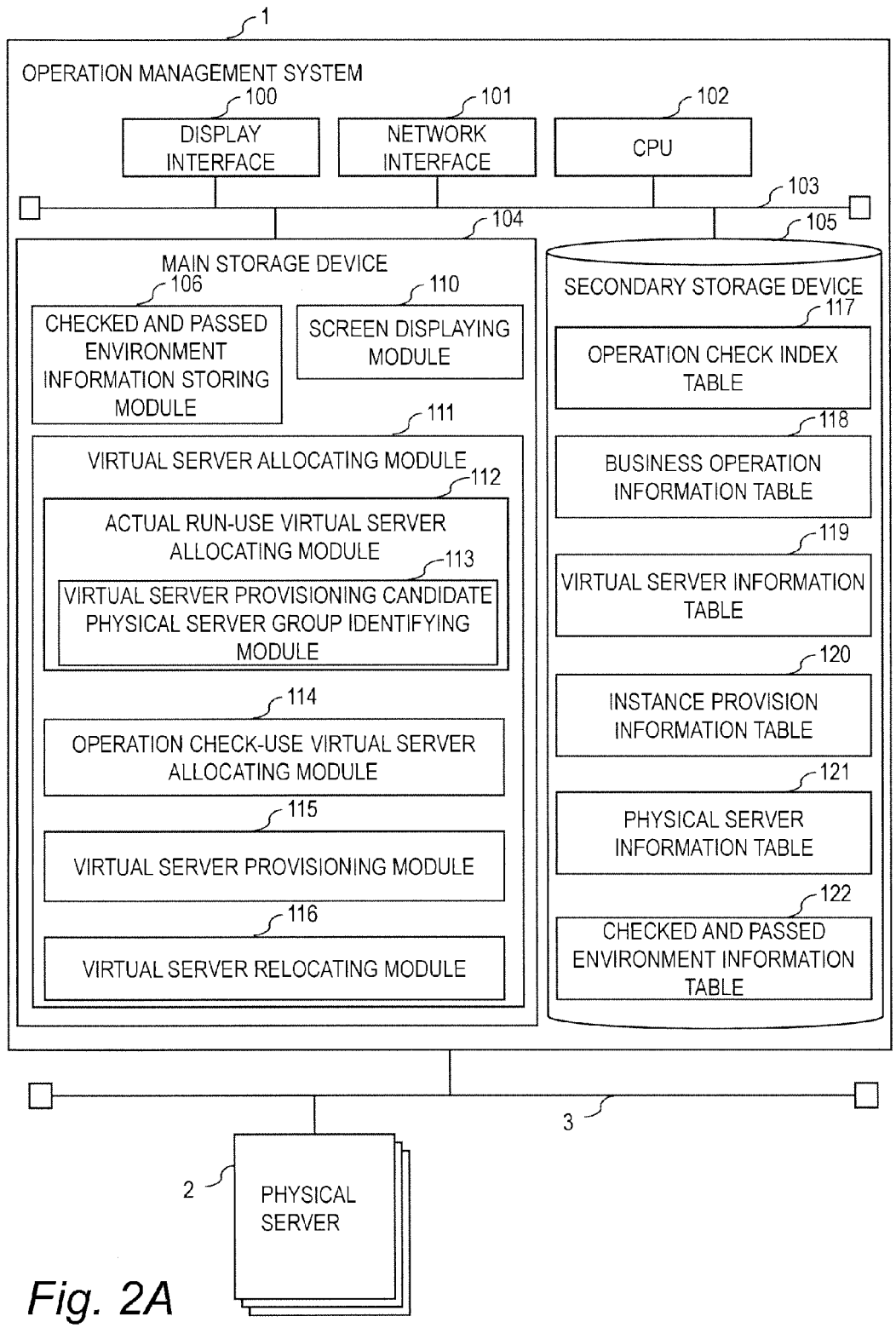
FIG. 2A is a diagram illustrating the overall configuration of the first embodiment.
Figure 2B:
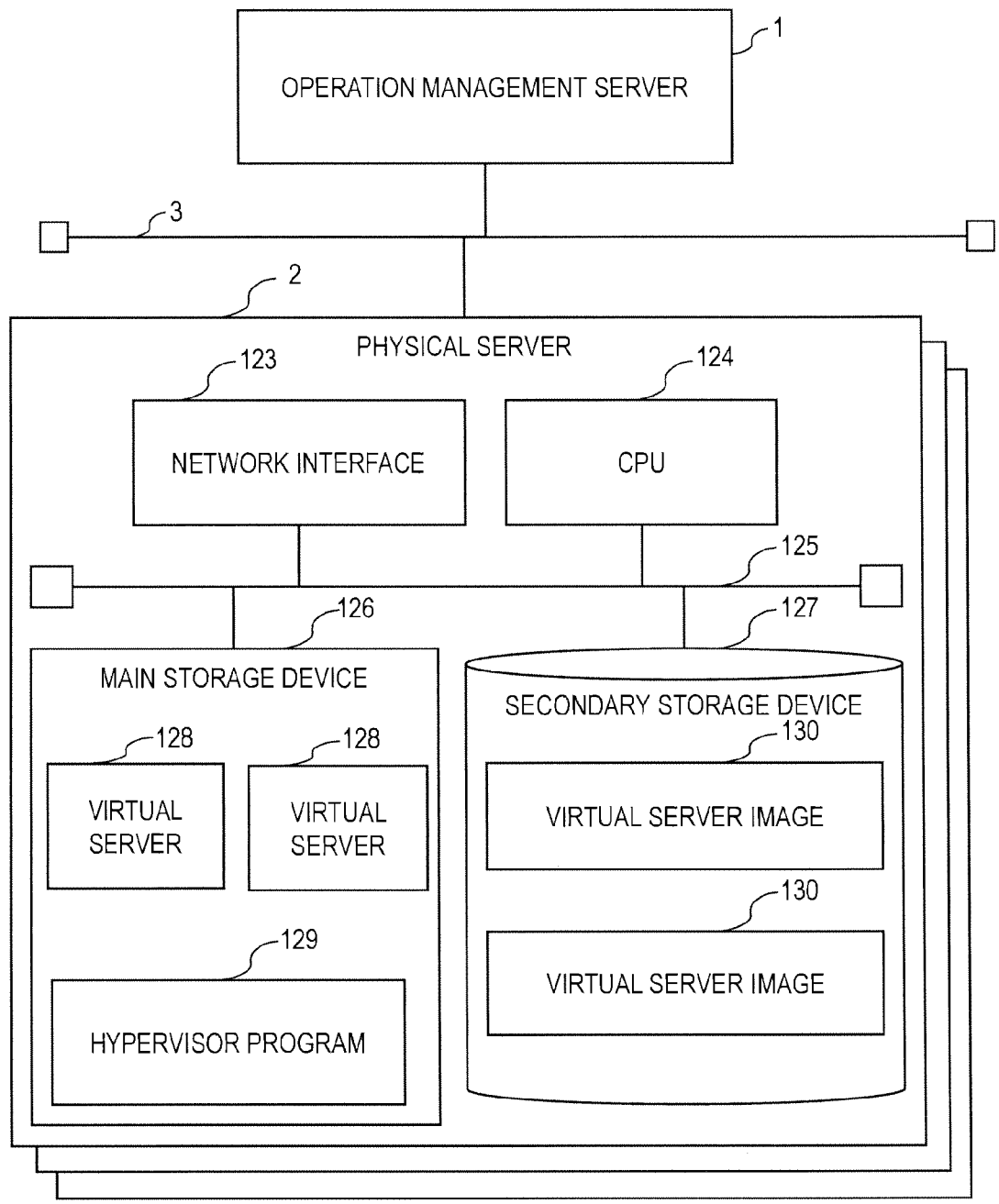
FIG. 2B is a diagram illustrating the overall configuration of the first embodiment.

FIGS. 2A and 2B illustrate the overall configuration of this embodiment. This embodiment is a computer system that includes as its components the operation management server 1, one or more physical servers 2, and a network 3.

The network 3 is a communication network for coupling the operation management server 1 and the physical servers 2 in a manner that allows mutual communication. The network 3 is, for example, a local area network (LAN) in a corporation or may be a wide area network (WAN).

The operation management server 1 is a computer device for managing a group of physical servers 2, and executes processing such as provisioning the virtual servers 128 in the physical servers 2 and relocating the virtual servers 128. Details thereof are described later. Each physical server 2 is a computer device capable of executing one or more virtual servers 128 by virtualization technology. In this embodiment, each business operation system implements a given function when the virtual server 128 that is a component of the business operation system is provisioned and executed in one of the physical servers 2.

<Configuration of the Operation Management Server 1>

As illustrated in FIG. 2A, the operation management server 1 is a computer device that includes a display interface 100, a network interface 101, a CPU 102, a bus 103, a main storage device 104, and a secondary storage device 105, and is coupled to the network 3 via the network interface 101.

The display interface 100 is an interface for connecting a display device such as a liquid crystal display (LCD) that is used by an administrator of the computer system in this embodiment. While this embodiment deals with an example in which the operation management server 1 has the display interface 100, functions of the operation management server 1 may be used from, for example, another computer device via the network 3 by Hypertext Transfer Protocol (HTTP) or a similar protocol.

The network interface 101 is an interface used by the operation management server 1 to couple to the network 3. The CPU 102 is an arithmetic processing unit that implements a given function of the operation management server 1 by executing a program stored in the main storage device 104.

The bus 103 is a communication path that connects the display interface 100, the network interface 101, the CPU 102, the main storage device 104, and the secondary storage device 105 in a manner that allows mutual communication. The main storage device 104 is a random access memory (RAM) or a similar storage device that stores a program executed by the CPU 102 and data necessary for the execution of the program. The program is, for example, an operating system (OS) (not shown).

The secondary storage device 105 is typically a hard disk device or a similar magnetic storage device that stores a program necessary for implementing a given function of the operation management server 1 (for example, a program stored in the main storage device 104 in FIG. 2A) and data. The secondary storage device 105 may instead be a semiconductor storage medium such as a flash memory, or a storage device outside of the operation management server 1 which is coupled via a storage area network (SAN) or the like.

Tables in the secondary storage device 105 are described. Details of the respective tables are described with reference to FIGS. 3 to 8. While FIG. 2A illustrates programs inside the main storage device 104 and tables inside the secondary storage device 105 for convenience, data necessary for processing of the operation management server 1 is typically stored from the secondary storage device 105 into the main storage device 104. Each type of information (data indicating the information) is stored in a storage area within the main storage device 104 and a storage area within the secondary storage device 105 that are assigned to the information.

The operation check index table 117 is a table for storing information that indicates the degree of operation check of a business operation system. The business operation information table 118 is a table for storing information about a business operation system that runs in this computer system.

A virtual server information table 119 is a table for storing, for each business operation system, information about a virtual server that is a component of the business operation system. An instance provision information table 120 is a table for storing information of a virtual server instance. The term "instance" means a virtual server provisioned in any physical server 2. A physical server information table 121 is a table for storing, for each physical server 2, information about the physical server 2.

The checked and passed environment information table 122 is a table for storing, for each virtual server, information on an environment that is observed when an operation check is conducted. The environment information is, for example, the serial number of the physical server 2 in which the virtual server is provisioned.

In this configuration example, information used for system operation management is stored in the tables described above. However, the information in this embodiment is not dependent on a particular data structure, and information stored in data storage areas in this embodiment can be expressed in any data structure. For instance, the information can be stored in a data structure selected suitably from the table structure, the list structure, and the database structure.

Various programs stored in the main storage device 104 are described. Details of major ones among the stored programs are described with reference to FIGS. 9 to 14. The checked and passed environment information storing module 106 is a program for storing, after a virtual server operation check, information of an environment that has been observed in the operation check in the checked and passed environment information table 122. A screen displaying module 110 is a program for displaying data that is managed by the operation management server 1 on a display device via the display interface 100.

A virtual server allocating module 111 is a program for provisioning virtual servers in the physical servers 2 and for relocating a virtual server that has been provisioned in one physical server 2 to another physical server 2. The virtual server allocating module 111 includes the actual run-use virtual server allocating module 112, which executes processing for allocating an actual run-use virtual server, the operation check-use virtual server allocating module 114, which executes processing for allocating an operation check-use virtual server, a virtual server provisioning module 115, which provisions virtual servers in the physical servers 2, and a virtual server relocating module 116, which relocates a virtual server between the physical servers 2.

The actual run-use virtual server allocating module 112 includes the virtual server provisioning candidate physical server group identifying module 113 which identifies, based on the checked and passed environment information table 122, a group of physical servers 2 in which a virtual server is to be provisioned.

<Description of the Physical Server 2>

As illustrated in FIG. 2B, the physical server 2 is a computer device that includes a network interface 123, a CPU 124, a bus 125, a main storage device 126, and a secondary storage device 127, and is coupled to the network 3 via the network interface 123.

The network interface 123 is an interface used by the physical server 2 to couple to the network 3. The CPU 124 is an arithmetic processing unit that implements a given function of the physical server 2 by executing a program stored in the main storage device 126.

The bus 125 is a communication path that connects the network interface 123, the CPU 124, the main storage device 126, and the secondary storage device 127 in a manner that allows mutual communication. The main storage device 126 is a RAM or a similar storage device that stores a program executed by the CPU 124 and data necessary for the execution of the program. The program is, for example, an OS (not shown).

The secondary storage device 127 is a hard disk device or a similar magnetic storage device that stores a program necessary for implementing a given function of the physical server 2 and data. The secondary storage device 127 may instead be a semiconductor storage medium such as a flash memory, or a storage device outside of the physical server 2 which is coupled via a SAN or the like.

Various programs stored in the main storage device 126 are described. The hypervisor program 129 is a program for executing one or more virtual servers 128 on the physical server 2 by logically partitioning the CPU 124, the main storage device 126, and other physical resources that are provided in the physical server 2, and allocating the partitioned resources to the virtual server 128.

Each virtual server 128 is a program executed by the hypervisor program 129. The virtual server 128 includes an OS, an application, and other programs as well as data and, when executed by the hypervisor program 129, behaves like a computer device.

A virtual server image 130 stored in the secondary storage device 127 is an image file which is the basis of the virtual server 128 that is executed on the physical server 2. The virtual server image 130 and the virtual server 128 may have a one-on-one relation with each other. Alternatively, in the case of a business operation system that has a plurality of virtual servers 128 of the same configuration as in a load-balancing cluster configuration, a plurality of virtual servers 128 may be copied from the same virtual server image 130.

While this embodiment is configured so as to store the virtual server image 130 in the secondary storage device 127 of the physical server 2, other configurations may be employed. For instance, the virtual server image 130 may be stored in a shared disk that is connected to the physical server 2 so that the physical server 2 and other physical servers 2 use the shared disk.

<Descriptions of the Tables>

FIG. 3 is a diagram illustrating the operation check index table 117. The operation check index table 117 is a table that has an operation check index 301, a display item 302, and to-be-stored environment information 303 as columns, and stores one row of data for each degree of operation check that is defined by the computer system.

A letter string or a numerical value that represents the degree of operation check demanded of a business operation system in question is set in a field of the operation check index 301. The demanded degree of operation check is uniquely identified from the operation check index 301. In this embodiment, one of "S", "A", and "B" is stored.

The display item 302 is a description of the operation check index 301. Set in a field of the display item 302 is a letter string to be displayed on a business operation information setting screen 1500, which is described later with reference to FIG. 15, when an operation check index is set to each business operation system on the business operation information setting screen 1500.

Set in a field of the to-be-stored environment information 303 is a letter string that represents information to be stored in the checked and passed environment information table 122 as checked and passed environment information after a virtual server operation check is conducted. In this embodiment, a continuous letter string obtained by punctuating column names of the physical server information table 121, which is described later with reference to FIG. 7, with commas "," is set as the to-be-stored environment information 303.

For instance, the case where an operation check including hardware (physical servers) is necessary corresponds to a row that holds "S" as the operation check index 301. The to-be-stored environment information 303 in this case is a level of information with which a physical server can be identified, and includes the serial number, hardware model number, and hypervisor type of the physical server.

A row holding "A" as the operation check index 301 corresponds to the case where a virtual server can be allocated to a physical server that is not identical but has the same hardware model number and hypervisor type as the checked and passed hardware model number and hypervisor type. In this case, the hardware model number and the hypervisor type alone are set as the to-be-stored environment information 303.

The case where checking on the virtual server level suffices corresponds to a row that holds "B" as the operation check index 301. In this case, information with which a physical server can be identified is unnecessary, and only the hypervisor type is therefore set as the to-be-stored environment information 303.

Each row of this table may be stored in the operation management server 1 in advance, or may be set by the administrator of the computer system of this embodiment through some setting screen.

Figure 4:
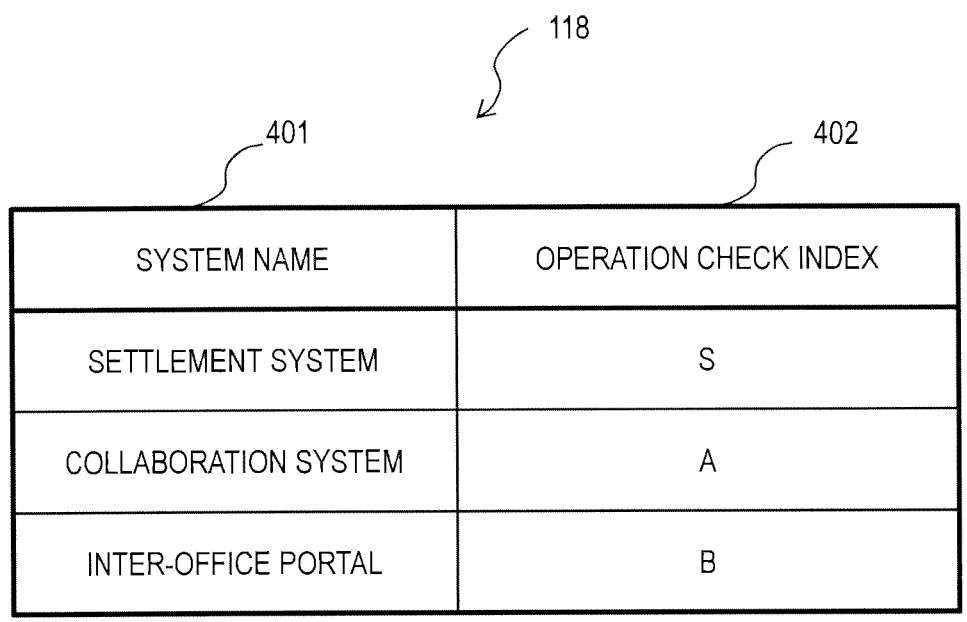
FIG. 4 is a diagram illustrating a business operation information table according to the first embodiment.

FIG. 4 is a diagram illustrating the business operation information table 118. The business operation information table 118 is a table that has a system name 401 and an operation check index 402 as columns, and holds one row for each business operation system. A letter string representing the name of a business operation system is set in a field of the system name 401. Each business operation system running in the computer system of this embodiment is uniquely identified from the system name 401.

Set in a field of the operation check index 402 is the value of the operation check index 301 of the operation check index table 117 which reflects the degree of operation check demanded of the business operation system written as the system name 401. While this embodiment is configured so that a different operation check index is set to every business operation system, the computer system may have a configuration in which the same operation check index is set to a plurality of business operation systems.

Figure 5:
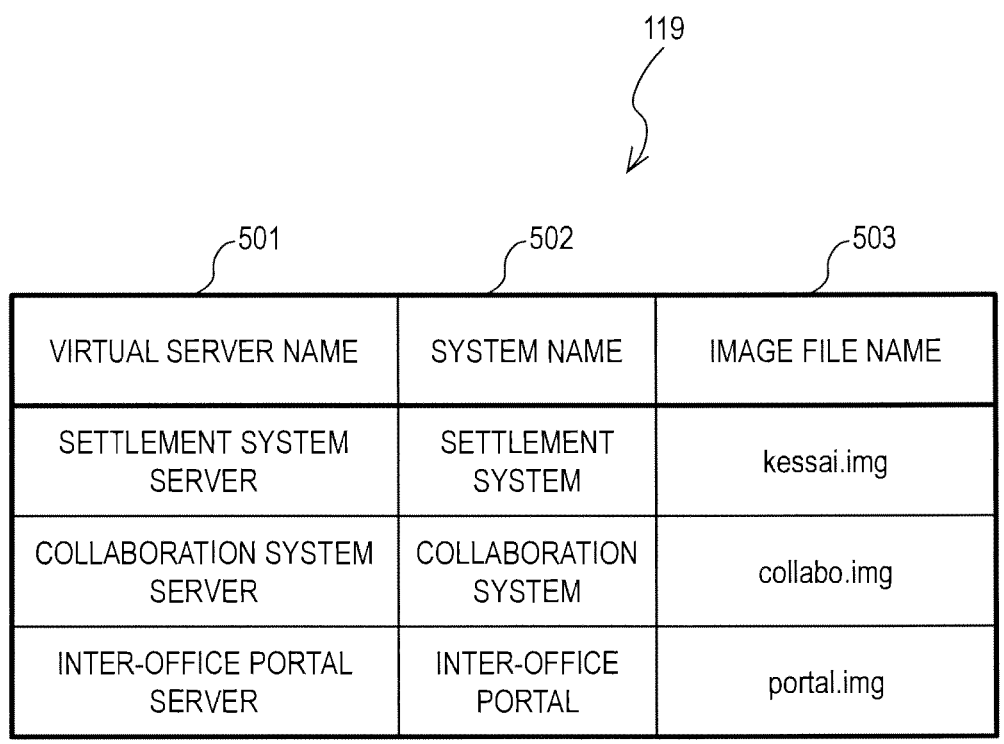
FIG. 5 is a diagram illustrating a virtual server information table according to the first embodiment.

FIG. 5 is a diagram illustrating the virtual server information table 119. The virtual server information table 119 is a table that has a virtual server name 501, a system name 502, and an image file name 503 as columns, and holds one row for each virtual server.

A letter string representing the name of a virtual server is set in a field of the virtual server name 501. Each virtual server is uniquely identified from the virtual server name 501. A letter string representing the name of a business operation system that has a virtual server in question as a component is set in a field of the system name 502. In this embodiment, a virtual server cannot be provisioned for a business operation system unless the name of the business operation system matches the system name 502 of the row for the virtual server.

A letter string representing the name of the virtual server image 130 which is stored in the secondary storage device 127 of the relevant physical server 2 is set in a field of the image file name 503. In this embodiment, when a virtual server is provisioned, the image file name 503 is specified as information that enables the hypervisor program 129 to uniquely identify the virtual server to be provisioned. The image file name 503 may include a directory name or the like. Other names than the image file name may be used as long as the information enables the hypervisor program 129 or other programs of the physical servers 2 to uniquely identify a virtual server to be provisioned.

FIG. 6 is a diagram illustrating the instance provision information table 120. The instance provision information table 120 is a table that has an instance name 601, a virtual server name 602, a CPU clock count 603, a physical server name 604, and operation check use 605 as columns, and holds one row for each virtual server instance.

A letter string representing the name of an instance is set in a field of the instance name 601. Each instance is uniquely identified from the instance name 601. A letter string representing the name of a virtual server that is the basis of an instance in question is set in a field of the virtual server name 602. The virtual server name 501 of the virtual server information table 119, which has been described above with reference to FIG. 5, is set in a field of the virtual server name 602.

Set in a field of the CPU clock count 603 is a letter string or a numerical character that represents a CPU clock count allocated to a virtual server instance in question. In this embodiment, the sum of CPU clock counts allocated to virtual server instances that are run on one physical server 2 is, at most, the CPU clock count of the CPU 124 that is provided in the physical server 2. A value equal to or lower than a CPU clock count 705 in the physical server information table 121, which is described later with reference to FIG. 7, is therefore set in a field of the CPU clock count 603.

A letter string representing the name of the physical server 2 in which a virtual server in question is provisioned is set in a field of the physical server name 604. The value of a physical server name 701 of the physical server information table 121, which is described later with reference to FIG. 7, is set as the physical server name 604.

Set in a field of the operation check use 605 is a letter string or a numerical character that indicates whether or not a virtual server (virtual server instance) in question has been allocated to be used for operation check. In this embodiment, "Y" indicates that the virtual server instance is allocated for operation check, and "N" indicates that the virtual server instance is allocated for actual run.

The example of FIG. 6 shows that instances (VM1 and VM2) of the settlement system server and instances (VM3 and VM4) of the collaboration system server are run as actual run-use instances, whereas instances (VM5 and VM6) of an inter-office portal server are run as operation check-use instances. The example also shows that VM1 and VM3 are provisioned in Physical Server One, that VM2 and VM4 are provisioned in Physical Server Two, and that each of the VMs is allocated a CPU clock count of 2.0 GHz. The instances VM5 and VM6 are provisioned in Physical Server Three.

FIG. 7 is a diagram illustrating the physical server information table 121. The physical server information table 121 is a table that has the physical server name 701, a serial number 702, a hardware model number 703, a hypervisor type 704, the CPU clock count 705, a free CPU clock count 706, and an IP address 707 as columns, and holds one row for each physical server 2.

A letter string representing the name of the physical server 2 is set in a field of the physical server name 701. Each physical server 2 is uniquely identified from the physical server name 701. Set in a field of the serial number 702 is a numerical value or a letter string with which a device used as the physical server 2 in question is uniquely identified. Set in a field of the hardware model number 703 is a numerical value or a letter string that represents the model number of a device used as the physical server 2 in question. Set in a field of the hypervisor type 704 is a letter string that represents the type of the hypervisor program 129 of the physical server 2 in question.

Set in a field of the CPU clock count 705 is a numerical value or a letter string that represents the clock count of the CPU 124 that is provided in the physical server 2 in question. Set in a field of the free CPU clock count 706 is a numerical value or a letter string that represents a CPU clock count that is not allocated to a virtual server instance in the physical server 2 in question. Set in a field of the IP address 707 is a numerical value or a letter string that represents an address allocated to the physical server 2 in question for communication to/from the physical server 2 via the network 3.

The physical server information table 121, which has the columns described above in this embodiment, may additionally have columns for the model number of the CPU 124, the capacity of the main storage device 126, the version or revision number of the hypervisor program 129, a logical unit (LU) provided by an external storage device to which the physical server 2 is connected, the count and model numbers of the network interfaces 123, and the like. The values of these columns may be set as the value of the to-be-stored environment information 303 of the operation check index table 117, which has been described with reference to FIG. 3.

As in the above description of FIG. 6, VM1 and VM3 are each allocated 2.0 GHz in Physical Server One, and the free CPU clock count of Physical Server One is therefore 0.0 GHz. The same applies to Physical Server Two in which VM2 and VM4 are provisioned.

FIG. 8 is a diagram illustrating the checked and passed environment information table 122. The checked and passed environment information table 122 is a table that has columns for a virtual server name 801 and checked and passed environment information 802, and holds one row for each virtual server as in the above description of FIG. 5. The reason that this table holds a record (row) for each virtual server instead of for each virtual server instance is because, when a plurality of instances having the same configuration are provided for a load-balancing cluster configuration, there is no need to store checked and passed environment information for each instance and storing checked and passed environment information for each virtual server suffices.

A letter string representing the name of a virtual server is set in a field of the virtual server name 801. In this embodiment, the value of the virtual server name 501 of the virtual server information table 120, which has been described with reference to FIG. 5, is set as the virtual server name 801.

Set in a field of the checked and passed environment information 802 is a letter string that represents information about an operation environment to which an operation check-use instance of a virtual server is allocated. In this embodiment, information of the relevant physical server 2 which is stored in the physical server information table 121 based on a value set as the to-be-stored environment information 303 of the operation check index table 117 is set as the checked and passed environment information 802. A value is stored in the checked and passed environment information table 122 in this embodiment when saving environment information is selected on a virtual server list screen 1700, which is described later with reference to FIG. 17.

In this embodiment, "S" is defined as the operation check index of the settlement system as in the above description of FIGS. 3 and 4, which means that the serial number, the hardware model number, and the hypervisor type are to be stored as checked and passed environment information. The checked and passed environment information table 122 therefore stores a serial number, a model number, and a hypervisor type as the checked and passed environment information 802 of the settlement system server.

<Description of Various Programs of the Operation Management Server 1>

Figure 9:
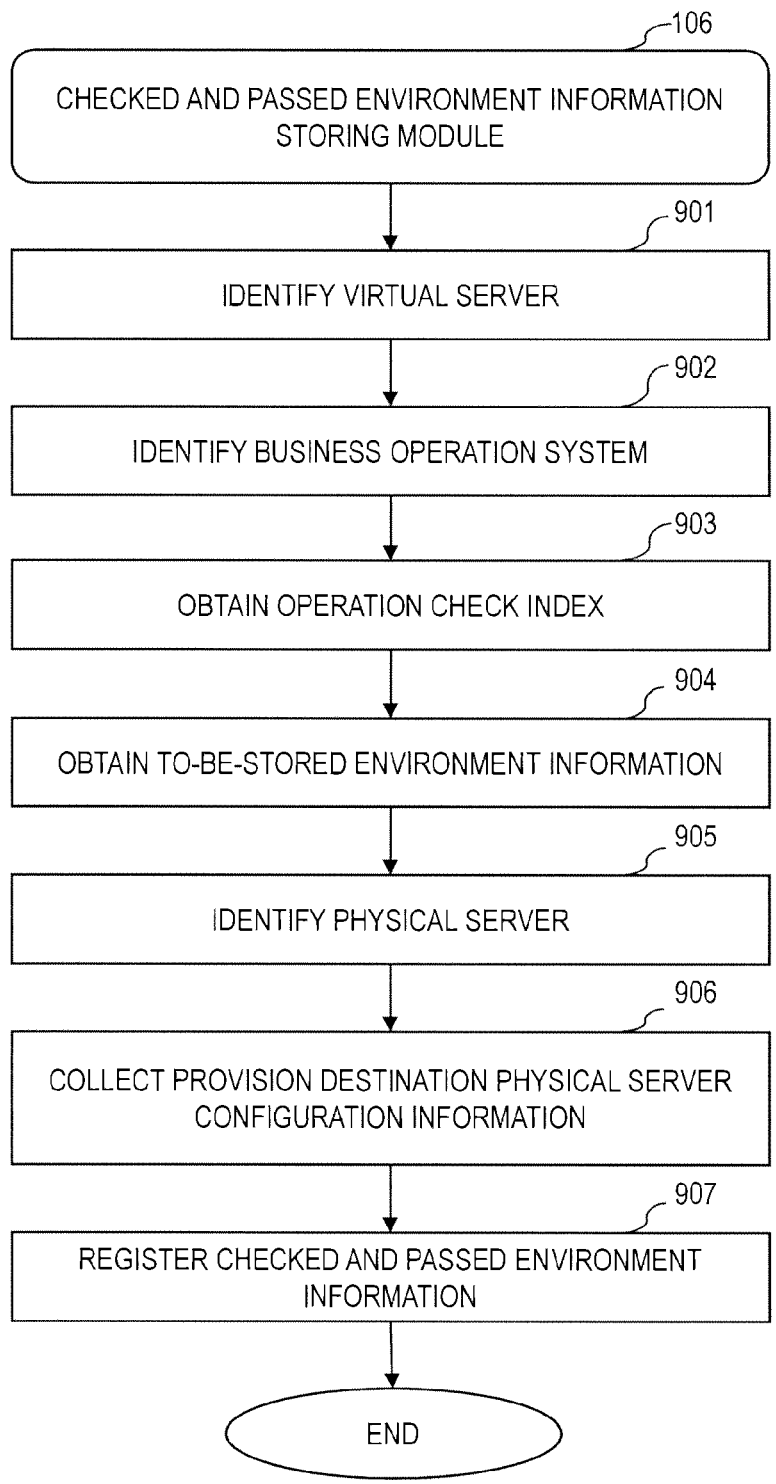
FIG. 9 is a diagram illustrating a processing procedure of the checked and passed environment information storing module according to the first embodiment.

FIG. 9 is a diagram illustrating a processing procedure of the checked and passed environment information storing module 106. The checked and passed environment information storing module 106 refers to environment information (configuration information) of a physical server on which an operation check-use virtual server instance is run, and stores necessary items in the environment information in the checked and passed environment information table 122. The checked and passed environment information table 122 stores environment information of a physical server that has been checked (for appropriate operation) with respect to a virtual server and passed the operation check as has been described with reference to FIG. 5.

The checked and passed environment information storing module 106 is called when a virtual server instance is selected and an instruction is given on saving environment information on the virtual server list screen 1700, which is described later with reference to FIG. 17. The checked and passed environment information storing module 106 receives as an input the instance name of the selected instance from the virtual server list screen 1700.

The checked and passed environment information storing module 106 first selects from the instance provision information table 120 a row whose instance name 601 matches the instance name received as an input, and obtains the virtual server name 602 of this row, thereby identifying a virtual server that is the basis of the instance (Step 901).

The checked and passed environment information storing module 106 next selects from the virtual server information table 119 a row whose virtual server name 501 matches the virtual server name 602 obtained in Step 901, and obtains the system name 502 of this row, thereby identifying a business operation system that has the virtual server in question as a component (Step 902).

The checked and passed environment information storing module 106 next selects from the business operation information table 118 a row whose system name 401 matches the system name 502 obtained in Step 902, and obtains the operation check index 402 of this row, thereby identifying the operation check index of the business operation system in question (Step 903).

The checked and passed environment information storing module 106 next selects from the operation check index table 117 a row whose operation check index 301 matches the operation check index 402 obtained in Step 903, and obtains the to-be-stored environment information 303 of this row, thereby obtaining one or more column names of the physical server information table 121 that is to be stored as checked and passed environment information (Step 904).

The checked and passed environment information storing module 106 next selects from the instance provision information table 120 a row whose instance name 601 matches the instance name received as an input, and obtains the physical server name 604 of this row, thereby identifying a physical server on which the virtual server instance is run (Step 905).

The checked and passed environment information storing module 106 next selects from the physical server information table 121 a row whose physical server name 701 matches the physical server name 604 obtained in Step 905, and obtains all the values of columns of this row that match the column names obtained in Step 904, thereby obtaining information of an environment that is observed when a virtual server instance operation check is conducted (Step 906).

The checked and passed environment information storing module 106 next adds a new row to the checked and passed environment information table 122, and sets as the checked and passed environment information 802 the values of the respective columns of the physical server information table 121 which have been obtained in Step 906. The checked and passed environment information storing module 106 also sets the virtual server name 602 obtained in Step 901 as the virtual server name 801 of the added row. In the case where the checked and passed environment information table 122 already has a row identical with the row to be newly added, the new row is not added. (Step 907)

In this embodiment, there are three types of operation check index, "S", "A", and "B", which differ from one another in environment information to be stored. The checked and passed environment information of a virtual server consequently varies depending on the operation check index of a business operation system that has the virtual server. For instance, information about the serial number, the hardware model number, and the hypervisor type is stored as the checked and passed environment information in the case of the settlement system server because the operation check index of the settlement system which has the settlement system server is "S". In the case of the inter-office portal server, on the other hand, only information about the hypervisor type is stored as the checked and passed environment information because the operation check index of the inter-office portal which has the inter-office portal server is "B".

Figure 10:
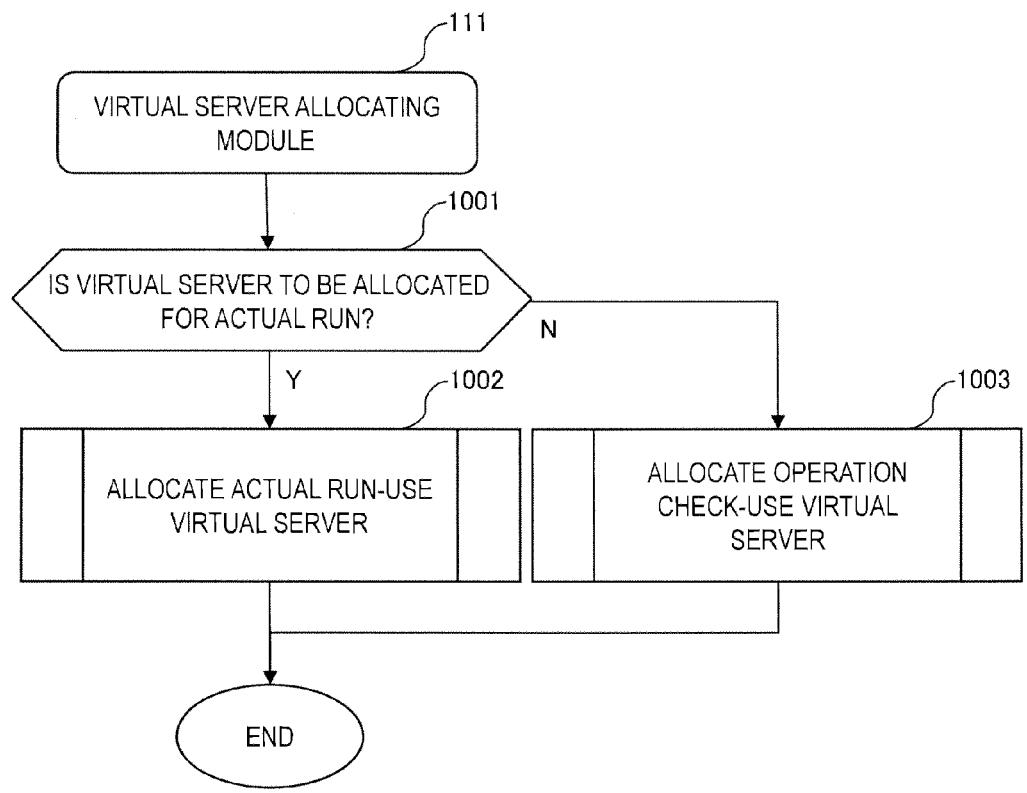
FIG. 10 is a diagram illustrating a processing procedure of a virtual server allocating module according to the first embodiment.

FIG. 10 is a diagram illustrating a processing procedure of the virtual server allocating module 111. The virtual server allocating module 111 allocates actual run-use virtual servers or operation check-use virtual servers to the physical servers 2. The virtual server allocating module 111 is called when an instruction is given on virtual server allocation on a virtual server allocating screen 1600, which is described with reference to FIG. 16. The virtual server allocating module 111 receives as an input a system name, a virtual server name, an instance name, a CPU clock count to be allocated to the virtual server, and use information indicating whether the virtual server to be allocated is for actual run or for operation check.

The virtual server allocating module 111 first refers to the use information received as an input to proceed to Step 1002 when the use is actual run (Y in Step 1001), and to Step 1003 when the use is operation check (N in Step 1001). In the case of allocating an actual run-use virtual server, the virtual server allocating module 111 calls the actual run-use virtual server allocating module 112 (Step 1002).

In the case of allocating an operation check-use virtual server, the virtual server allocating module 111 calls the operation check-use virtual server allocating module 114 (Step 1003). To call the actual run-use virtual server allocating module 112 or the operation check-use virtual server allocating module 114, the virtual server allocating module 111 hands over the information received as an input to the processing module to be called as an input.

Figure 11:
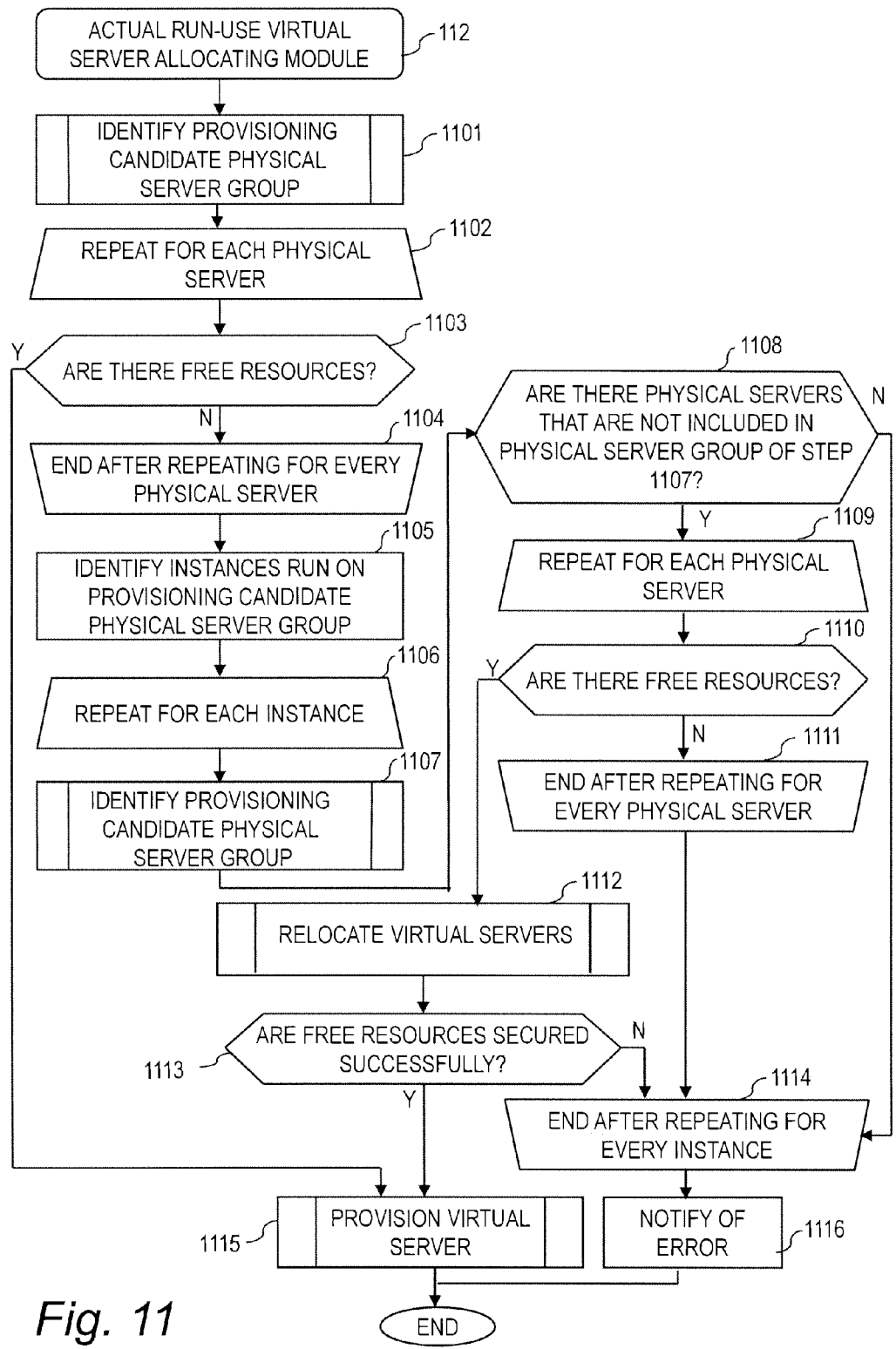
FIG. 11 is a diagram illustrating a processing procedure of the actual run-use virtual server allocating module according to the first embodiment.

FIG. 11 is a diagram illustrating a processing procedure of the actual run-use virtual server allocating module 112. The actual run-use virtual server allocating module 112 selects the physical server 2 that has a checked and passed operation environment, and provisions an actual run-use instance of a virtual server in the selected physical server 2 (Step 1002 in FIG. 10). In the case where physical resources that can be allocated to the target virtual server are lacking, the actual run-use virtual server allocating module 112 relocates running instances of other virtual servers and allocates the thus created free resources to the target virtual server.

A concrete description is given on the processing of the actual run-use virtual server allocating module 112. The actual run-use virtual server allocating module 112 receives as an input from the virtual server allocating module 111 a system name, a virtual server name, an instance name, and a CPU clock count. When receiving the input, the actual run-use virtual server allocating module 112 calls the virtual server provisioning candidate physical server group identifying module 113 to identify a group of physical servers on which the virtual server instance received as an input can be run (group of physical servers that have a checked and passed operation environment) (Step 1101).

In this example, a list of the physical server names 701 of the physical server information table 121 is returned from the virtual server provisioning candidate physical server group identifying module 113. The virtual server provisioning candidate physical server group identifying module 113 is described later in detail with reference to FIG. 12.

The actual run-use virtual server allocating module 112 repeats Step 1103 for every physical server name obtained in Step 1101 (Step 1102). Specifically, the actual run-use virtual server allocating module 112 selects from the physical server information table 121 a row whose physical server name 701 matches the current processing target physical server name, and checks whether or not there are free resources.

In the check, the actual run-use virtual server allocating module 112 determines that there are free resources when the free CPU clock count of the target physical server has a value equal to or larger than the CPU clock count received as an input (Y in Step 1103). When the CPU clock count received as an input is greater than the free CPU clock count (N in Step 1103), it is determined that there are no free resources.

When there are free resources (Y in Step 1103), the processing moves to Step 1115. The actual run-use virtual server allocating module 112 instructs the virtual server provisioning module 115 to provision the virtual server in a physical server that is the processing target in Step 1103. Details of the virtual server provisioning module 115 are described later with reference to FIG. 14.

When there are no free resources, the actual run-use virtual server allocating module 112 executes Step 1103 for the next physical server name. After Step 1103 is repeated for every physical server name obtained in Step 1101, the processing moves to Step 1105 (Step 1104). The processing moves to Step 1105 in the case where none of the physical servers determined as virtual server provisioning candidates in Step 1101 has free resources.

In the subsequent steps, when there are no free resources, the actual run-use virtual server allocating module 112 secures free resources enough to provision the virtual server received as an input by relocating instances of other virtual servers that are already running.

The actual run-use virtual server allocating module 112 first obtains the instance name 601 from every row in the instance provision information table 120 whose physical server name 604 is included in the physical server name list obtained in Step 1101, thereby identifying virtual server instances to be relocated (Step 1105).

Operation check-use instances may be excluded from instances to be relocated in order not to hinder virtual server operation check. The actual run-use virtual server allocating module 112 can identify an operation check-use instance by referring to a field of the operation check use 605 of the instance provision information table 120.

The actual run-use virtual server allocating module 112 next repeats Steps 1107 to 1113 for every instance name identified in Step 1105 (Step 1106). Specifically, the actual run-use virtual server allocating module 112 calls the virtual server provisioning candidate physical server group identifying module 113 to identify a group of physical servers in which a virtual server that is the basis of the current processing target instance which is running can be provisioned, and obtains a list of the physical server names of the group of physical servers as in Step 1101 (Step 1107).

The actual run-use virtual server allocating module 112 next compares the physical server name list obtained in Step 1101 (List One) and the physical server name list obtained in Step 1107 (List Two) to obtain a list of physical server names that are included in List Two and that are not included in List One (List Three). List One is a list of a group of physical servers in which the virtual server instance received as an input can be run. List Two is a list of a group of physical servers on which the current processing target instance selected from a group of relocation target instances can be run.

In the case where List Three is empty, in other words, when the physical servers on List One are the only physical servers to which the current processing target instance which is running can be relocated (N in Step 1108), the fact that there are no free resources is already known and the processing therefore returns to Step 1106, where the processing target shifts to the next instance. In the case where List Three is not empty (Y in Step 1108), there is a possibility that free resources can be secured in a physical server on List One by relocating instances, and the processing therefore moves to Step 1109.

The actual run-use virtual server allocating module 112 next repeats Step 1110 for every physical server name on the physical server name list obtained in Step 1108 (List Three) (Step 1109). Specifically, the actual run-use virtual server allocating module 112 selects from the physical server information table 121 a row whose physical server name 701 matches the current processing target physical server name, and checks whether or not there are free resources by the same procedure that is used in Step 1103 (Step 1110).

When there are free resources, the processing moves to Step 1112, where the actual run-use virtual server allocating module 112 relocates the target instance to this physical server. When there are no free resources, Step 1110 is executed for the next physical server name.

In the case where the step is repeated for every physical server, in other words, when there are no physical servers to which the current processing target instance can be relocated, the actual run-use virtual server allocating module 112 executes Step 1107 for the next instance (Step 1111).

When there are free resources and the virtual server instance is relocated, the actual run-use virtual server allocating module 112 instructs the virtual server relocating module 116 to relocate the virtual server instance so that the current processing target instance is relocated to a physical server that has the current processing target physical server name (Step 1112).

The actual run-use virtual server allocating module 112 next checks whether or not free resources have successfully been secured in one of the physical servers of the physical server group identified in Step 1101 (List One) by the virtual server relocation (Step 1112) (Step 1113). When there are free resources (Y in Step 1113), the processing moves to Step 1115, where the actual run-use virtual server allocating module 112 provisions the virtual server in a relevant physical server. When there are no free resources (N in Step 1113), the actual run-use virtual server allocating module 112 executes Step 1107 for the next instance. The check on whether there are free resources (Step 1113) is conducted by the same procedure that is used in Steps 1102 to 1104.

When free resources have not been secured successfully even after repeating Steps 1107 to 1113 for every instance and relocating instances (N in Step 1113 for every instance), or when there are no instances that can be relocated (N in Step 1108 for every instance), the processing moves to Step 1116, where the fact that the virtual server cannot be provisioned is notified of as an error (Step 1116). To notify of the error, an error message is displayed on the virtual server allocating screen 1600.

This processing checks the resource availability of physical servers that are provisioning candidates from the top of the list as described above in Step 1102 and, as soon as free resources are found in a physical server, provisions a virtual server in the physical server. Alternatively, a virtual server may be provisioned preferentially in a physical server with few free resources in order to raise a resource utilization ratio.

An actual example is given to describe the behavior of the virtual server allocating module 111. In the case where allocating the collaboration system server is requested, for example, the virtual server provisioning candidate physical server group identifying module 113 which is described with reference to FIG. 12 returns Physical Server One, Physical Server Two, and Physical Server Three as a provision candidate physical server group. Of these physical servers, Physical Server Three has a free CPU clock count of 2.0 GHz as described above with reference to FIG. 7, and the collaboration system server is therefore provisioned in Physical Server Three.

In the case where allocating the settlement system server is requested, on the other hand, the virtual server provisioning candidate physical server group identifying module 113 returns Physical Server One and Physical Server Two as a provision candidate physical server group. Physical Server One and Physical Server Two do not have a free CPU clock count as described above with reference to FIG. 7.

The virtual server allocating module 111 therefore identifies virtual servers that are running on Physical Server One and Physical Server Two and that can be relocated to other physical servers. In this example, an instance of the collaboration system server (VM3 or VM4) is determined as a virtual server that can be relocated, and the virtual server allocating module 111 relocates the instance of the collaboration system server to Physical Server Three or Physical Server Four, and then provisions the settlement system server in Physical Server One or Physical Server Two.

Figure 12:
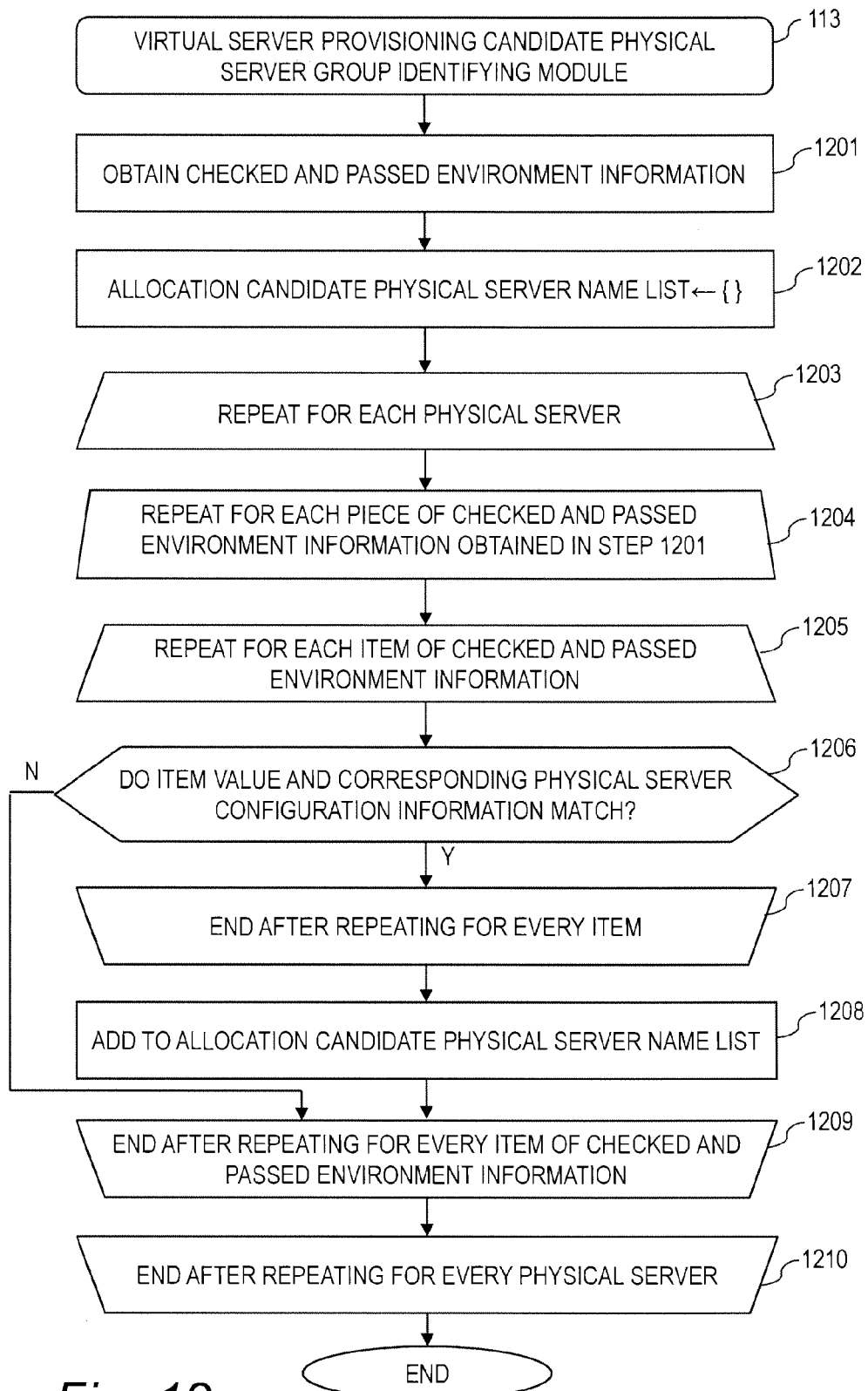
FIG. 12 is a diagram illustrating a processing procedure of a virtual server provisioning candidate physical server group identifying module according to the first embodiment.

The checked and passed environment information 802 of the settlement system server includes a serial number, a hardware model number, and a hypervisor type as described above with reference to FIG. 8, and Physical Server One and Physical Server Two are therefore returned as the provisioning candidate physical server group of the settlement system server. FIG. 12 is a diagram illustrating a processing procedure of the virtual server provisioning candidate physical server group identifying module 113. The virtual server provisioning candidate physical server group identifying module 113 identifies a group of physical servers on which a virtual server instance can be run. As described above with reference to FIG. 11, Step 1101 and Step 1107 are executed in the actual run-use virtual server allocating processing. The virtual server provisioning candidate physical server group identifying module 113 receives a virtual server name as an input from the actual run-use virtual server allocating module 112.

The virtual server provisioning candidate physical server group identifying module 113 first obtains the checked and passed environment information 802 from every row in the checked and passed environment information table 122 whose virtual server name 801 matches the virtual server name received as an input (Step 1201). The virtual server provisioning candidate physical server group identifying module 113 next creates a list for storing the physical server names of provisioning candidate physical servers (Step 1202).

The virtual server provisioning candidate physical server group identifying module 113 next repeats Steps 1204 to 1209 for each row in the physical server information table 121 (Step 1203). Steps 1205 to 1208 are then repeated for the checked and passed environment information 802 of each row obtained in Step 1201 (Step 1204).

The virtual server provisioning candidate physical server group identifying module 113 next repeats Step 1206 for each item stored in the checked and passed environment information 802 that is the current processing target (Step 1205). The term "item" means each value in the "column name=value" format which is separated from another value by a comma "," among values stored as checked and passed environment information in the example of the checked and passed environment information table 122 of FIG. 8.

The virtual server provisioning candidate physical server group identifying module 113 next checks whether or not the value of a column in the current processing target row of the physical server information table 121 that matches the column name of the current processing target item matches the value of the current processing target item (Step 1206). When the two match (Y in Step 1206), Step 1206 is executed for the next item.

When the two do not match (N in Step 1206), the current processing target physical server is not regarded as a virtual server provisioning candidate physical server with respect to the checked and passed environment information that is the current processing target, and the virtual server provisioning candidate physical server group identifying module 113 therefore executes Step 1205 for the next checked and passed environment information.

After Step 1206 is repeated for every item of the checked and passed environment information that is the current processing target, the processing moves to Step 1207. In the case where Step 1206 is repeated for every item, it means that information of the current processing target physical server matches the checked and passed environment information, and the current processing target physical server is determined as a provisioning candidate physical server. The virtual server provisioning candidate physical server group identifying module 113 adds the physical server name of the physical server determined as a provisioning candidate to the list created in Step 1202 (Step 1208). In the case where the physical server name is already on the list, the physical server name is not added.

After processing every obtained piece of checked and passed environment information, the virtual server provisioning candidate physical server group identifying module 113 moves to Step 1210, where Steps 1204 to 1208 are executed for the next physical server (Step 1209). After every physical server is processed, the processing of the virtual server provisioning candidate physical server group identifying module 113 is ended and the physical server name list created in Step 1202 is returned (Step 1210). The virtual server provisioning candidate physical server group identifying module 113 here executes the processing described above for every physical server. Alternatively, the virtual server provisioning candidate physical server group identifying module 113 may receive information for limiting processing targets to particular physical servers as an input from the virtual server allocating module 111 in order to execute the processing described above only for some physical servers.

An actual example is given to describe the behavior of the virtual server provisioning candidate physical server group identifying module 113. The checked and passed environment information 802 of the settlement system server includes a serial number, a hardware model number, and a hypervisor type as described above with reference to FIG. 8, and Physical Server One and Physical Server Two are therefore returned as the provisioning candidate physical server group of the settlement system server.

The checked and passed environment information 802 of the collaboration system server includes a hardware number and a hypervisor type. Physical Server One, Physical Server Two, and Physical Server Three are returned as the provisioning candidate physical server group of the collaboration system server.

Lastly, the checked and passed environment information 802 of the inter-office portal server includes a hypervisor type alone, and Physical Server One, Physical Server Two, Physical Server Three, and Physical Server Four are therefore returned as the provisioning candidate physical server group of the inter-office portal server.

Figure 13:
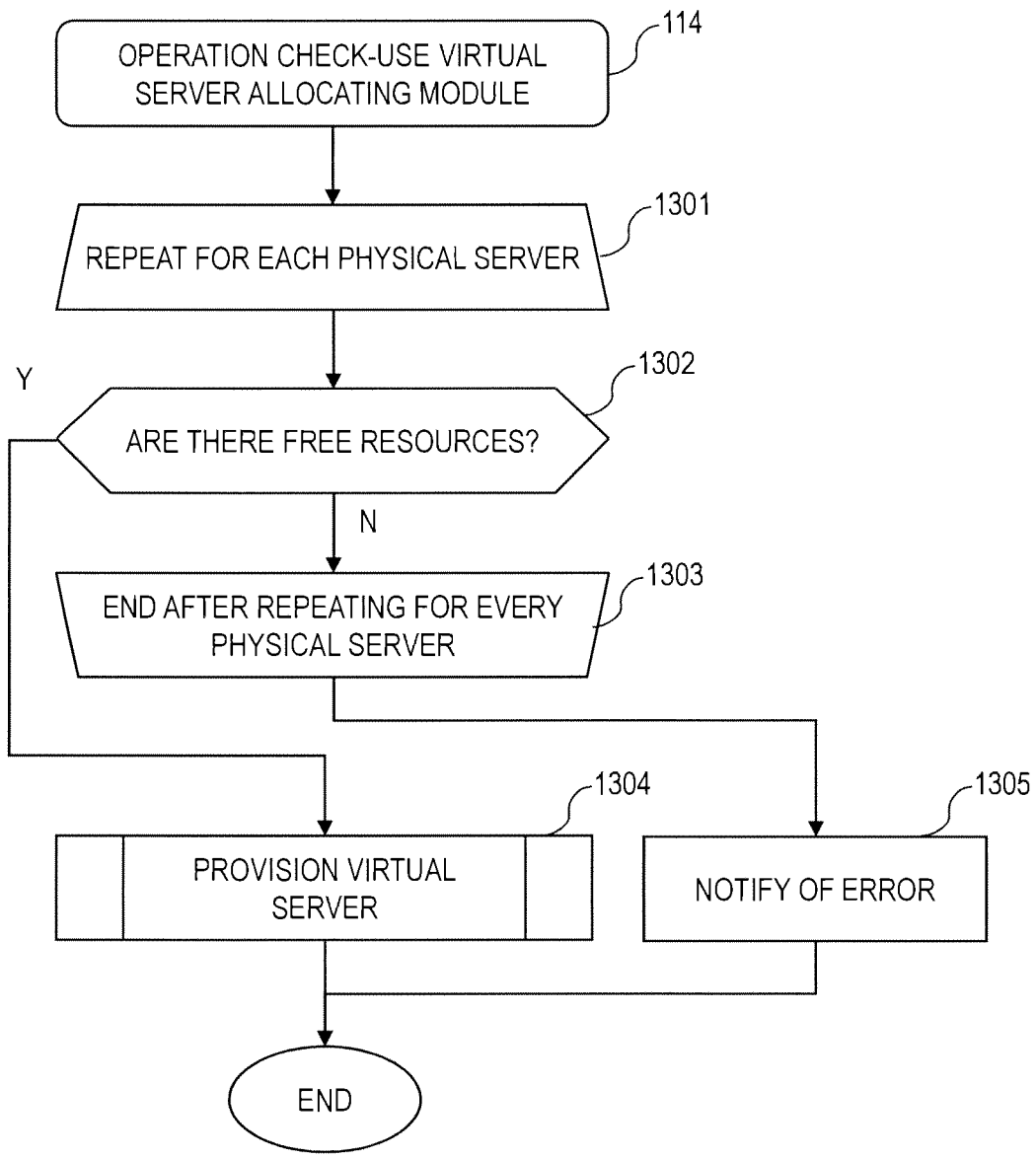
FIG. 13 is a diagram illustrating a processing procedure of an operation check-use virtual server allocating module according to the first embodiment.

FIG. 13 is a diagram illustrating a processing procedure of the operation check-use virtual server allocating module 114. The operation check-use virtual server allocating module 114 provisions an operation check-use instance of a virtual server in a physical server (Step 1003 in FIG. 10). The operation check-use virtual server allocating module 114 receives a system name, a virtual server name, an instance name, and a CPU clock count as an input from the virtual server allocating module 111.

The operation check-use virtual server allocating module 114 first repeats Step 1302 for each row in the physical server information table 121 (Step 1301). In Step 1302, the operation check-use virtual server allocating module 114 selects from the physical server information table 121 a row whose physical server name 701 matches the current processing target physical server name and checks whether or not the physical server has free resources. The free resource check is conducted by the same procedure that has been described above in Step 1103 of the processing procedure of FIG. 11 which is executed by the actual run-use virtual server allocating module 112.

When there are free resources (Y in Step 1302), the operation check-use virtual server allocating module 114 provisions the virtual server in a relevant physical server in Step 1304. Specifically, the operation check-use virtual server allocating module 114 instructs the virtual server provisioning module 115 to provision the virtual server in a physical server that is the processing target in Step 1302 (Step 1304). Details of the virtual server provisioning module 115 are described later with reference to FIG. 14.

When there are no free resources (N in Step 1302), the operation check-use virtual server allocating module 114 executes Step 1302 for the next physical server name. After Step 1302 is repeated for every physical server name, the processing moves to Step 1305 (Step 1303). Because the processing moves to Step 1305 when none of the physical servers has free resources, the operation check-use virtual server allocating module 114 notifies of the fact that the virtual server cannot be provisioned as an error (Step 1305). To notify of the error, an error message is displayed on the virtual server allocating screen 1600.

In Step 1301, the resource availability of physical servers that are provisioning candidates is checked from the top of the list and, as soon as free resources are found in a physical server, a virtual server is provisioned in the physical server. However, as in the case of FIG. 11, a virtual server may be provisioned preferentially in a physical server with few free resources in order to raise a resource utilization ratio.

Figure 14:
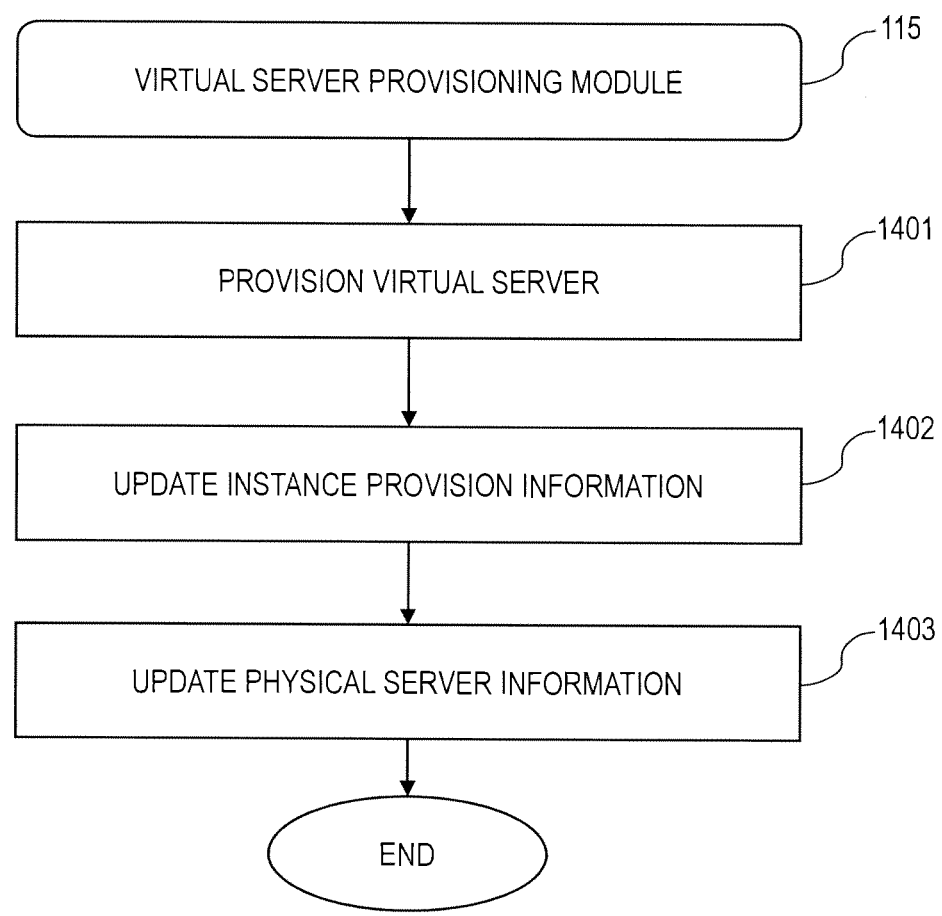
FIG. 14 is a diagram illustrating a processing procedure of a virtual server provisioning module according to the first embodiment.

FIG. 14 is a diagram illustrating a processing procedure of the virtual server provisioning module 115. In response to a request from the actual run-use virtual server allocating module 112 or the operation check-use virtual server allocating module 114, the virtual server provisioning module 115 uses a hypervisor program to provision an actual run-use instance or operation check-use instance of a virtual server in a physical server. The virtual server provisioning module 115 receives a physical server name, a virtual server name, an instance name, a CPU clock count, and use information indicating whether the use is actual run or operation check as an input from the actual run-use virtual server allocating module 112 or the operation check-use virtual server allocating module 114.

The virtual server provisioning module 115 first instructs the hypervisor program 129 of the physical server 2 that is the provision destination to provision the virtual server (Step 1401). The provision destination physical server 2 is identified by selecting from the physical server information table 121 a row whose physical server name 701 matches the physical server name received as an input, and obtaining the IP address 707 of this row.

The virtual server provisioning module 115 gives the hypervisor program 129 specification on an image file name to be used when the hypervisor program 129 provisions the virtual server and a CPU clock count to be allocated to the virtual server instance. The specified image file name is the image file name 503 obtained from a row in the virtual server information table 119 whose virtual server name 501 matches the virtual server name received as an input.

The virtual server provisioning module 115 next adds one row to the instance provision information table 120 based on information of the provisioned virtual server so that the virtual server provision is reflected on the table (Step 1402). In the added row, the instance name, the virtual server name, the CPU clock count, and the physical server name that have been received as an input are respectively set in the fields of the instance name 601, the virtual server name 602, the CPU clock count 603, and the physical server name 604. In the field of the operation check use 605, "N" is set in the case where the use information received as an input indicates actual run use, and "Y" is stored in the case where the received use information indicates operation check use.

The virtual server provisioning module 115 next selects from the physical server information table 701 a row whose physical server name 701 matches the physical server name received as an input, and sets in a field of the free CPU clock count 706 of this row a value obtained by subtracting the CPU clock count value that has been received as an input from the pre-update value of the free CPU clock count 706 (Step 1403). The reduction of free resources due to the provision of the virtual server in the physical server 2 is thus reflected.

The processing procedure of the virtual server provisioning module 115 is as described above, and a processing procedure of the virtual server relocating module 116 follows a similar flow which includes virtual server relocation, instance provision information update, and physical server information update. In instance provision information update, however, the virtual server relocating module 116 changes the value of a field of the physical server name 604 to the physical server name of the relocation destination, instead of adding a row to the instance provision information table 120.

In physical server information update, the virtual server relocating module 116 increases the free CPU clock count of the relocation source physical server by a CPU clock count that has been allocated to the relocated virtual server, and reduces the free CPU clock count of the relocation destination physical server.

Figure 15:
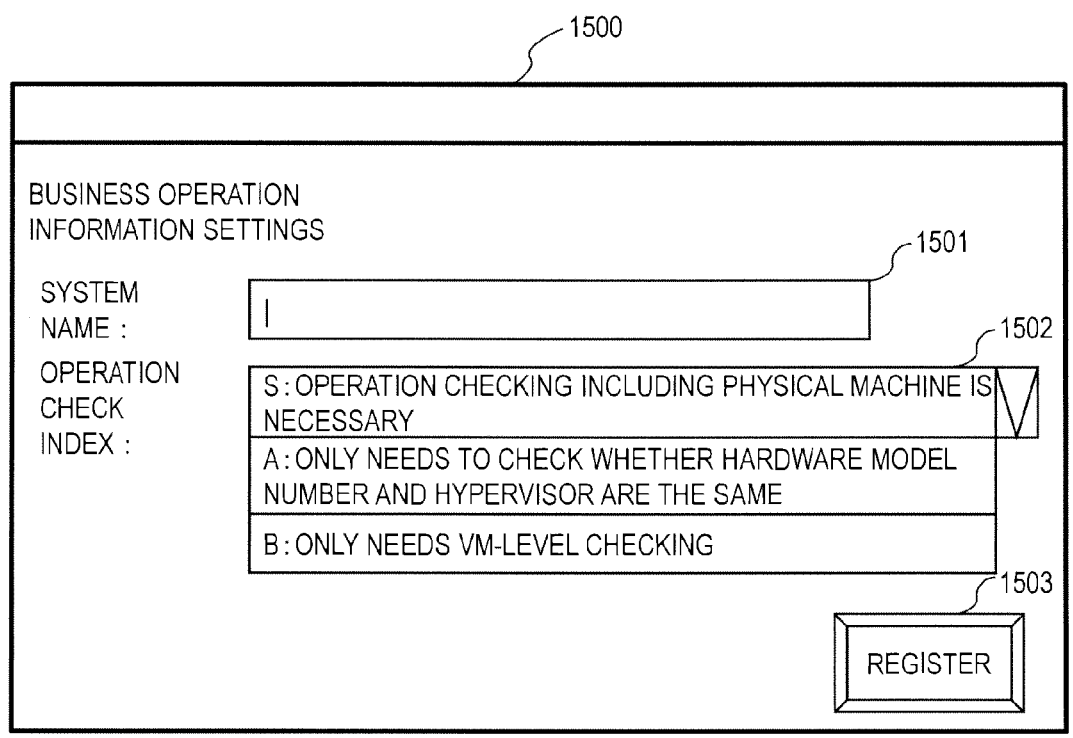
FIG. 15 is a diagram illustrating a business operation information setting screen according to the first embodiment.

A concrete description is given below on a graphical user interface (GUI) of the operation management server 1. FIG. 15 is an example of a diagram illustrating the business operation information setting screen 1500. The business operation information setting screen 1500 is a screen for setting information about a business operation system that is run in the computer system of this embodiment, and the information set on the business operation information setting screen is stored in the business operation information table 118 (see FIG. 4).

A system name field 1501 is a text field for inputting a letter string that represents the name of a business operation system. Data set in this field is set in a field of the system name 401 of the business operation information table 118.

The operation check index of the business operation system specified by the system name 1501 is input in an operation check index field 1502. In this example, a pull-down menu displays a plurality of combinations of the operation check index 301 and the display item 302 based on information stored in the operation check index tale 117. The operation check index selected here is set as the operation check index 402 in the business operation information table 118. A "register" button 1503 is a button with which information input on the business operation information setting screen 1500 is reflected on the business operation information table 118.

Figure 16:
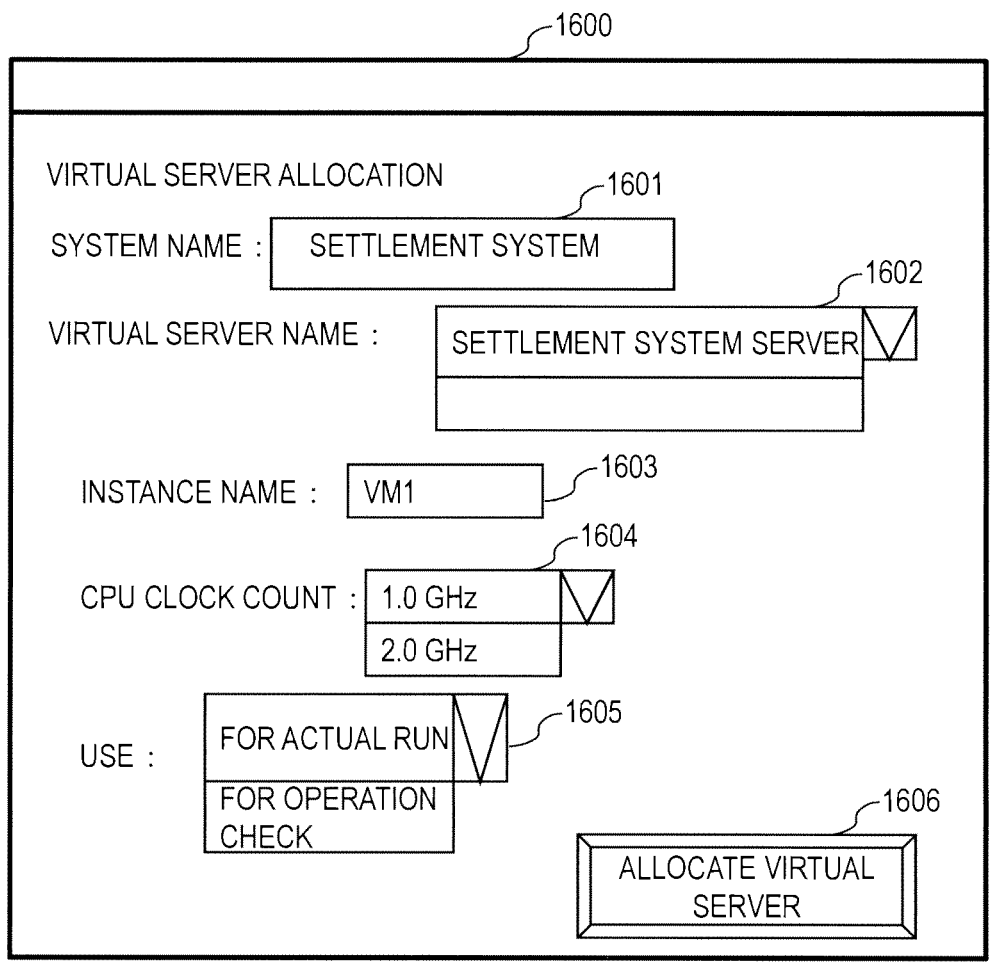
FIG. 16 is a diagram illustrating a virtual server allocating screen according to the first embodiment.

FIG. 16 is an example of a diagram illustrating the virtual server allocating screen 1600. The virtual server allocating screen 1600 is a screen for running a virtual server instance by specifying a virtual server to be allocated, a CPU clock count, and the like.

A system name 1601 represents the name of a business operation system to which a virtual server is to be allocated. In this embodiment, a system name appropriate for where the user account of a user who uses the operation management server 1 belongs and which business operation system the user takes charge of is displayed as the system name 1601. The virtual server allocating screen 1600 of FIG. 16 is a virtual server allocating screen that is displayed when a user who takes charge of the settlement system logs in to the operation management server 1.

To input a virtual server name as a virtual server name 1602, the administrator selects a virtual server to be allocated from a pull-down menu which displays a list of virtual servers that the business operation system displayed as the system name 1601 has. The displayed virtual server name 1602 is based on data stored in the virtual server information table 119. In the case of the collaboration system, for example, "collaboration system server" is displayed on the pull-down menu of the virtual server name 1602. A plurality of virtual server names may be displayed in the case where there are a plurality of virtual servers. The virtual server name selected here is set in a field of the virtual server name 602 of the instance provision information table 120 after the virtual server is provisioned.

An instance name field 1603 is a text field for inputting the name of a virtual server instance. While the instance name is input through the virtual server allocating screen 1600 in this embodiment, the operation management server 1 may automatically set the instance name. The instance name input here is set in a field of the instance name 601 of the instance provision information table 120.

A use field 1605 is a field for specifying whether the virtual server to be allocated is used for actual run or for operation check. In this example, the two options are displayed on a pull-down menu. When actual run use is selected, the processing of the actual run-use virtual server allocating module 112 is executed, and the processing of the operation check-use virtual server allocating module 114 is executed when operation check use is selected. The choice made here is set in a field of the operation check use 605 of the instance provision information table 120 after the virtual server is provisioned.

An "allocate virtual server" button 1606 is for instructing the operation management server 1 to allocate a virtual server based on information input through the virtual server allocating screen 1600. The virtual server allocating module 111 is called with the press of this button.

Figure 17:
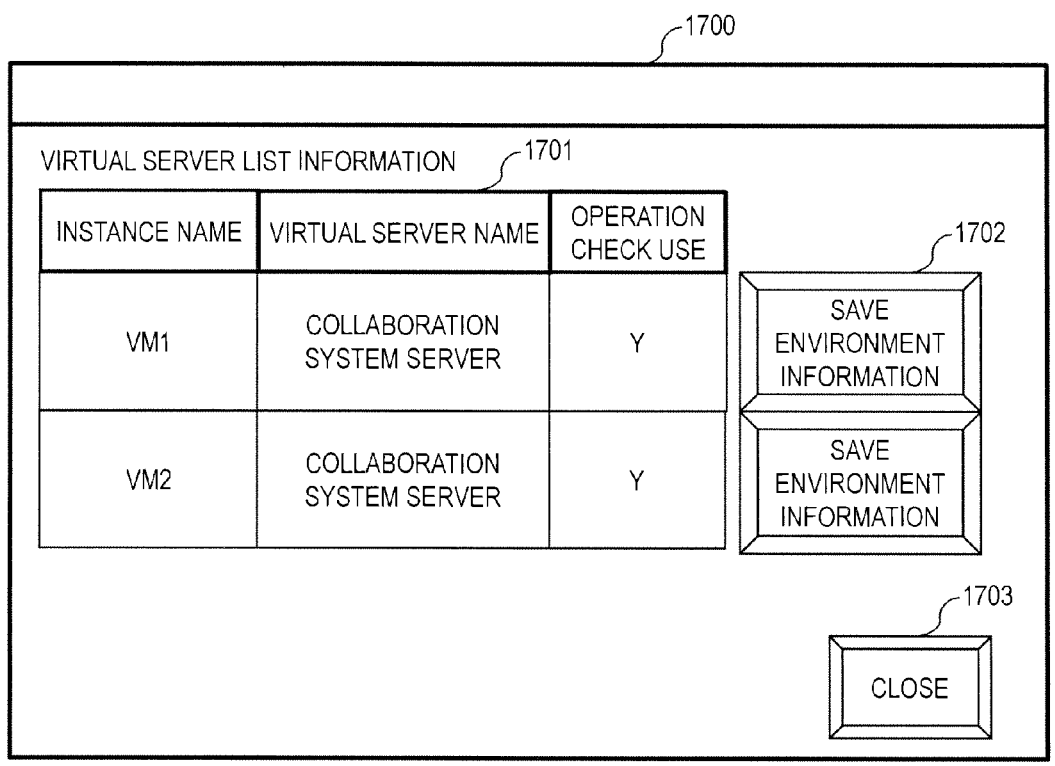
FIG. 17 is a diagram illustrating a virtual server list screen according to the first embodiment.

FIG. 17 is an example of a diagram illustrating the virtual server list information screen 1700. The virtual server list information screen 1700 is a screen for displaying, in a list, information about virtual server instances that have been provisioned. Similarly to the virtual server allocating screen 1600, this screen, too, displays only virtual server instance information related to a specific business operation system that is determined by where the user account of a user who uses the operation management server 1 belongs and which business operation system the user takes charge of.

Virtual server list information 1701 displays information of a virtual server instance based on data stored in the instance provision information table 120. The virtual server list information 1701 in this embodiment displays the instance name, the virtual server name, and use information.

A "save environment information" button 1702 is a button for storing environment information of a virtual server that is allocated for operation check use in the checked and passed environment information table 122. The checked and passed environment information storing module 106 is called with the press of the button 1702. A "close" button 1703 is a button for closing the virtual server list information screen 1700.

<Effects and Other Configurations of this Embodiment>

The first embodiment has now been described. According to this embodiment, there is no need to conduct an operation check on a business operation system for every physical resource even in an environment where integrated IT resources are shared by a plurality of business operation systems, and cost related to operation check of business operation systems is reduced.

In this embodiment, the configuration information of a physical resource on which a virtual resource is dependent is collected at a granularity suited to the degree of operation check defined to a business operation system that includes the virtual resource as a component. The collected information is stored as checked and passed environment information of the virtual resource, and a group of physical resources on which the virtual resource is to be dependent is determined based on the checked and passed environment information of the virtual resource when a new virtual resource is to be allocated to a business operation system. A physical resource to which the virtual resource can be allocated is identified from the result of an operation check of configuration items specified by an operation check index. Appropriate physical resources can thus be allocated efficiently to business operation systems that are different from one another in demanded reliability.

In addition, when a business operation system is to be allocated a virtual resource, a virtual resource can be allocated from a physical resource that is deemed as having passed a check. This eliminates the need to conduct an operation check after the virtual resource allocation, and accordingly reduces cost related to operation check.

Moreover, physical resources to which a virtual resource can be allocated are selected dynamically based on checked and passed environment information of the virtual resource. This eliminates the need to build and maintain a resource pool for each business operation system, and accordingly reduces running cost.

In the preferred configuration described above, one operation check index value (see FIG. 4, for example) is set to a business operation system. In other words, the same operation check index is set to every virtual server in a business operation system. The computer system may be designed so that different operation check indices can be set to virtual servers in a business operation system.

In the preferred configuration described above, the checked and passed environment information table 122 includes only information items specified by an operation check index out of configuration information of a checked and passed physical server (see FIG. 8, for example). By thus excluding configuration information items that are unnecessary to identify the configuration of a physical server to which a virtual server can be allocated, the computer system reduces the chance of the checked and passed environment information table 122 keeping information that differs from the current state of the computer system after changes are made to physical servers.

However, the computer system may also be designed so that the checked and passed environment information table 122 includes the values of other items than configuration information items specified by an operation check index. For instance, the virtual server provisioning candidate physical server group identifying module 113 can appropriately identify a candidate physical server group by referring to the operation check index and selecting necessary configuration information items from checked and passed environment information.

In the preferred configuration described above, the checked and passed environment information table 122 stores configuration information of a physical server that has passed an operation check (see FIG. 8, for example). The computer system may be designed so that the checked and passed environment information table 122 includes other types of information for identifying the configuration of a physical server to which a virtual server can be allocated, instead of or in addition to the checked and passed physical server configuration information. For instance, in the case where an operation check on a specific component guarantees the operation of a virtual server in other similar components, values indicating those components may be stored in the checked and passed environment information table 122.

A program is executed by a processor (for example, CPU) to perform given processing with the use of a storage device and a communication port (communication control device). Accordingly, descriptions given in the embodiment above with a program as the subject can be read as descriptions having a processor as the subject. It can also be said that processing executed by a program is processing performed by a computer on which the program operates. For instance, the operation management server and the CPU that operate as programmed by the program described above which executes processing of allocating a virtual server to a business operation system are management devices which manage the computer system.

At least some of the programs may be implemented by dedicated hardware. The programs can be installed in each computer from a program distribution server or a computer-readable medium, to be stored in a non-volatile storage device of the computer. At least some of the setting processing procedures performed by the user via a GUI in the configuration example described above may be executed by a program. The description given above on other configurations of this embodiment applies to a second embodiment described below.

Second Embodiment

The second embodiment of this invention is described. The second embodiment deals with an example of the operation management server 1 that is capable of, in addition to the functions described above in the first embodiment, detecting a virtual server that is affected by a configuration change such as the addition, replacement, and discarding of the physical servers 2.

An affected virtual server here means a virtual server that requires a new operation check due to a configuration change. In the case of replacing one physical server 2 with another, for example, there is a chance that the serial number, hardware model number, and hypervisor type of the new physical server 2 differ from those of the replaced physical server 2. When the replacement changes only the serial number of the physical server 2, for example, the collaboration system and inter-office portal system described above with reference to FIGS. 3 and 4 and a similar system for which an operation check does not include checking whether the serial numbers of the physical servers 2 match are not affected by the replacement of the physical servers 2.

On the other hand, the new replacement physical server 2 is not deemed as having passed a check for the settlement system and other business operation systems that require an operation check including the hardware configuration of physical servers. Therefore, fewer physical servers 2 can be provisioning candidates of the settlement system server and an operation check needs to be conducted on the replacement physical server 2 or the physical server 2 that has not undergone an operation check. In this embodiment, a virtual server that needs an operation check can be detected based on configuration change information and checked and passed environment information of the virtual server.

Figure 18:
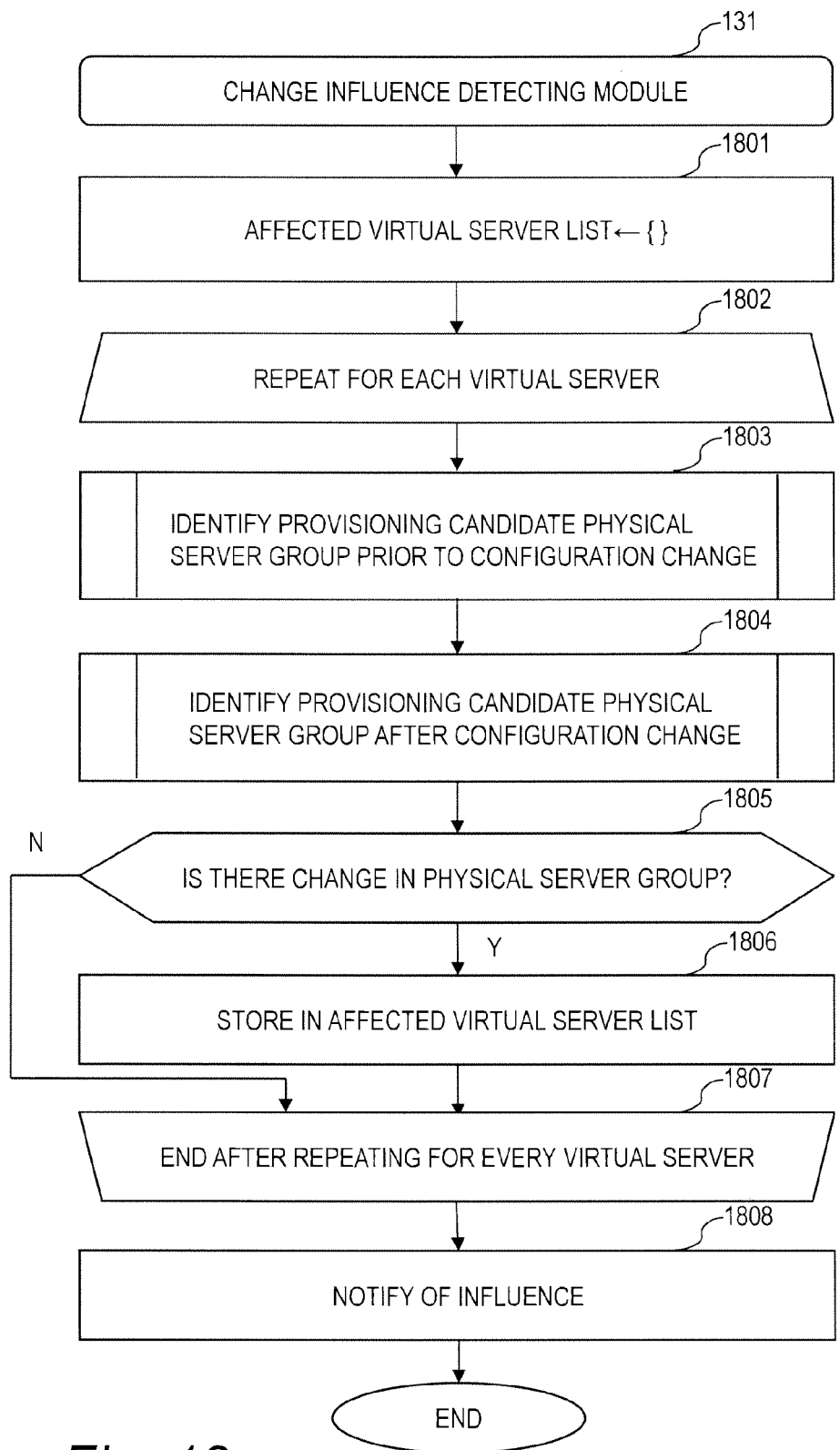
FIG. 18 is a diagram illustrating a diagram illustrating a processing procedure of a change influence detecting module.

A part of the second embodiment which has already been described in the first embodiment is omitted from the following description. FIG. 18 is a diagram illustrating a processing procedure of a change influence detecting module 131, which detects a virtual server affected by a configuration change such as the addition, replacement, and discarding of the physical servers 2. The change influence detecting module 131 is a program stored in the main storage device 104 of the operation management server 1.

When a configuration change such as the addition, replacement, and discarding of the physical servers 2 occurs, the change influence detecting module 131 receives configuration change information as an input with the use of a configuration detection function or other commonly provided function of operation management software, or a screen (not shown). The change influence detecting module 131 in this embodiment receives as an input all rows of the physical server information table 121 prior to the configuration change and all rows of the physical server information table 121 after the configuration change.

The change influence detecting module 131 first creates a list for storing the name of virtual servers that are affected by the configuration change (Step 1801). Next, Steps 1803 to 1306 are repeated for each row in the physical server information table 121 (see FIG. 7) (Step 1802).

Specifically, the change influence detecting module 131 identifies a group of physical servers which can be provisioning candidates of the current processing target virtual server (Physical Server Group One) based on data in the physical server information table 121 prior to the configuration change which has been received as an input (Step 1803). Physical Server Group One is identified by calling the virtual server provisioning candidate physical server group identifying module 113 as described above in the first embodiment.

The change influence detecting module 131 next identifies a group of physical servers which can be provisioning candidates of the current processing target virtual server (Physical Server Group Two) based on data in the physical server information table 121 after the configuration change which has been received as an input (Step 1804). Physical Server Group Two is identified by calling the virtual server provisioning candidate physical server group identifying module 113 as in Step 1803.

The change influence detecting module 131 next compares Physical Server Group One identified in Step 1803 and Physical Server Group Two identified in Step 1804 to check whether or not there is a change in physical server group (Step 1805). When a change is found (Y in Step 1805), the change influence detecting module 131 moves to Step 1806 to add the current processing target virtual server to the list created in Step 1801 as a virtual server affected by the change (Step 1806). When there is no change in physical server group (N in Step 1805), Steps 1803 to 1806 are executed for the next virtual server.

There are several ways to check whether there is a change in physical server group and determine whether to add to the virtual server list. For instance, in the case where the configuration change is the addition of the physical servers 2, the number of physical servers may be larger in Physical Server Group Two than in Physical Server Group One. In this case, the result of the configuration change is simply an increase in the number of physical servers that can be virtual server provisioning candidates. The change influence detecting module 131 therefore determines that the provisioning of the virtual server is not affected, and does not add the virtual server to the list.

In the case where the configuration change is the replacement or discarding of physical servers, the resultant change in serial number, hardware model number, and hypervisor type makes Physical Server Group Two smaller than Physical Server Group One, in other words, reduces the number of physical servers that can be provisioning candidates. The change influence detecting module 131 therefore determines that the virtual server is affected, and adds the virtual server to the list.

After repeating Steps 1803 to 1806 for every virtual server, the processing moves to Step 1808 (Step 1807). Lastly, in the case where a virtual server has been determined as being affected by the configuration change in preceding steps, the change influence detecting module 131 uses a screen (not shown) or the like to notify of the fact that an operation check is needed (Step 1808).

The processing of the change influence detecting module 131 is described with reference to the physical server information table 121 of FIG. 7 and the checked and passed environment information table 122 of FIG. 8, taking as an example a case of replacing a physical server whose name is "Physical Server One". Here, only the serial number 702 of the replacement physical server differs from that of the physical server to be replaced, and the hardware model number 703 and the hypervisor type 704 do not change.

First, in the case of the settlement system server, the provisioning candidate physical server group prior to the configuration change is constituted of "Physical Server One" and "Physical Server Two" according to the checked and passed environment information. The provisioning candidate physical server group after the configuration change, on the other hand, consists solely of "Physical Server Two". The configuration change has reduced the number of provisioning candidate physical servers, and the change influence detecting module 131 therefore determines that the settlement system server is affected by the configuration change.

In the case of the collaboration system server and the inter-office portal server, the provisioning candidate physical server group prior to the configuration change is constituted of "Physical Server One" to "Physical Server Four" according to the checked and passed environment information. The replacement physical server differs from the replaced physical server only in serial number and, accordingly, the provisioning candidate physical server group after the configuration change is constituted of "Physical Server One" to "Physical Server Four" as well. The change influence detecting module 131 therefore determines that the collaboration system server and the inter-office portal server are not affected by the configuration change.

There are several ways to conduct an operation check on a virtual server when the change influence detecting module 131 determines that the virtual server is affected by the configuration change. One way is to allocate, after the need for operation check is notified of in Step 1808, an operation check-use virtual server through the virtual server allocating screen 1600 described above in the first embodiment, and then conduct an operation check of the virtual server.

Another way is to prepare various types of processing performed in a virtual server operation check in advance as a script or other forms of program, provision an operation check-use virtual server in the physical server 2 that has been changed in Steps 1803 to 1805 of the processing of the change influence detecting module 131, and then execute the prepared program to automatically conduct an operation check.

<Effects of this Embodiment>

The second embodiment has now been described. According to this embodiment, a virtual resource that is affected by a configuration change of physical resources can automatically be detected based on checked and passed environment information of the virtual resource, and running cost required for a configuration change is therefore reduced.

A detailed description has been given on this invention with reference to the accompanying drawings. However, this invention is not limited to those concrete configurations, and encompasses various modifications and equivalent configurations that are within the spirit set forth in the following scope of claims.

This invention is applicable to a computer system which includes a plurality of physical servers integrated to be shared by a plurality of business operation systems, and which provisions virtual servers included in the business operation systems in the physical servers.

What is claimed is:

1. An operation managing method for a computer system that comprises a management device and a physical computer group, the physical computer group comprising a plurality of physical computers, each physical computer in the physical computer group executing a virtualization control program, the method comprising:
- receiving, by the management device from a business operation system, an input indicating a virtual server to be allocated to the business operation system;
- allocating, by the management device, an operation check-use virtual server to a physical computer in the physical computer group to perform an operation check;
- obtaining, by the management device, from a checked and passed environment information storage area, checked and passed environment information,
  - wherein the checked and passed environment information is generated as a result of the operation check of the operation check-use virtual server on the physical computer in the physical computer group,
  - the checked and passed environment information including a value of at least one configuration information item for identifying a configuration of a physical computer to which an actual run-use virtual server is allocable,
  - the at least one configuration information item being specified with a value of an operation check index that is set for the actual run-use virtual server;
- obtaining, by the management device, configuration information of each physical computer in the physical computer group from a configuration information storage area; and
- selecting, by the management device, from the physical computer group, a physical computer to which the actual run-use virtual server is to be allocated based on the obtained checked and passed environment information and the obtained configuration information.

2. The method according to claim 1,
wherein the value of the at least one configuration information item comprises the value of at least one configuration information item in the physical computer on which the operation check of the operation check-use virtual server has been conducted, and
wherein other configuration information items other than the at least one configuration information item are excluded from the checked and passed environment information.

3. The method according to claim 2,
further comprising selecting, by the management device, as the physical computer to which the actual run-use virtual server is to be allocated, a physical computer that has a value matching the value of the at least one configuration information item.

4. The method according to claim 2,
wherein the value of the operation check index is set for each business operation system, and
wherein different values of the operation check index specify different configuration information items.

5. The method according to claim 2,
wherein the at least one configuration information item specified by the value of the operation check index comprises at least one out of a serial number of a physical computer, a hardware model number of a physical computer, and a type of a hypervisor that is operating on a physical computer.

6. The method according to claim 1,
further comprising, when none of the physical computers in the physical computer group to which the actual run-use virtual server is allocable has free resources to which the actual run-use virtual server is allocable:
- identifying, by the management device, a second virtual server which is operating on one of the physical computers to which the actual run-use virtual server is allocable and which is relocatable to another physical computer, based on checked and passed environment information of the second virtual server; and
- allocating, by the management device, to the actual run-use virtual server, free resources that are generated by relocating the second virtual server to the another physical computer.

7. The method according to claim 6,
wherein the identifying of the second virtual server comprises excluding a virtual server for which an operation check is being conducted.

8. The method according to claim 1,
further comprising, when there is a change in a configuration of the physical computer group:
- checking, by the management device, based on specifics of the change and the checked and passed environment information of the operation check-use virtual server, whether the change is in the physical computers to which the actual run-use virtual server is allocable; and
- when the change is in the physical computers, determining, by the management device, that the actual run-use virtual server is a virtual server that is affected by the change in the configuration.

9. A computer system, comprising:
- a physical computer group which comprises a plurality of physical computers, each physical computer in the physical computer group executing a virtualization control program;
- a checked and passed environment information storage area for storing checked and passed environment information,
  - wherein the checked and passed environment information comprises a value of at least one configuration information item specified by a value of an operation check index set for an actual run-use virtual server, and which is generated as a result of an operation check of an allocated operation check-use virtual server on a physical computer in the physical computer group;
- a configuration information storage area for storing configuration information of each physical computer in the physical computer group; and
- a management device configured to
  - receive an input from a business operation system indicating a virtual server to be allocated to a business operation system;
  - allocate an operation check-use virtual server to a physical computer in the physical computer group to perform an operation check;
  - obtain, from the checked and passed environment information storage area, checked and passed environment information;
  - obtain configuration information of each physical computer in the physical computer group from the configuration information storage area;
  - identify a configuration of a physical computer to which an actual run-use virtual server is allocable by referring to the checked and passed environment information, and
  - identify, as the physical computer to which the actual run-use virtual server is allocable, a physical computer that has the identified configuration by referring to the configuration information.

10. The computer system according to claim 9,
wherein the value of the at least one configuration information item comprises the value of at least one configuration information item in the physical computer on which the operation check of the operation check-use virtual server has been conducted, and
wherein other configuration information items other than the at least one configuration information item are excluded from the checked and passed environment information.

11. The computer system according to claim 10,
wherein the management device is configured to identify, as the physical computer to which the actual run-use virtual server is allocable, a physical computer that has a value matching the value of the at least one configuration information item.

12. The computer system according to claim 9,
wherein, when none of the physical computers in the physical computer group to which the actual run-use virtual server is allocable has free resources to which the actual run-use virtual server is allocable,
the management device is configured to
identify a second virtual server which is operating on a physical computer to which the actual run-use virtual server is allocable and which is relocatable to another physical computer, based on checked and passed environment information of the second virtual server, and
allocate, to the actual run-use virtual server, free resources that are generated by relocating the second virtual server to the another physical computer.

13. The computer system according to claim 9,
wherein, when there is a change in a configuration of the physical computer group, the management device is configured to
check, based on specifics of the change and the checked and passed environment information of the operation check-use virtual server, whether the change is in the physical computers to which the actual run-use virtual server is allocable; and
when the change is in the physical computers, determine that the actual run-use virtual server is a virtual server that is affected by the change in the configuration.

14. A non-transitory computer-readable storage medium having a program that controls a processor of a management computer so as to execute processing in a computer system which includes the management computer and a physical computer group, the physical computer group comprising a plurality of physical computers each of which executes a virtualization program,
wherein the processing comprises:
receiving, by the management device from a business operation system, an input indicating a virtual server to be allocated to the business operation system;
allocating, by the management device, an operation check-use virtual server to a physical computer in the physical computer group to perform an operation check;
obtaining, by the management device, from a checked and passed environment information storage area, checked and passed environment information,
wherein the checked and passed environment information is generated as a result of the operation check of the operation check-use virtual server on the physical computer in the physical computer group,
the checked and passed environment information including a value of at least one configuration information item for identifying a configuration of a physical computer to which an actual run-use virtual server is allocable,
the at least one configuration information item being specified with a value of an operation check index that is set for the actual run-use virtual server;
obtaining, by the management device, configuration information of each physical computer in the physical computer group from a configuration information storage area; and
selecting, by the management device, from the physical computer group, a physical computer to which the actual run-use virtual server is to be allocated based on the obtained checked and passed environment information and the obtained configuration information.

15. The non-transitory computer-readable storage medium according to claim 14,
wherein the value of the at least one configuration information item comprises the value of at least one configuration information item in the physical computer on which the operation check of the operation check-use virtual server has been conducted, and
wherein other configuration information items other than the at least one configuration information item are excluded from the checked and passed environment information.

16. The non-transitory computer-readable storage medium according to claim 15,
wherein the selecting a physical computer to which the actual run-use virtual server to be allocated comprises selecting a physical computer that has a value matching the value of the at least one configuration information item.

17. The non-transitory computer-readable storage medium according to claim 14,
wherein the processing further comprises, when none of the physical computers in the physical computer group to which the actual run-use virtual server is allocable has free resources to which the actual run-use virtual server is allocable:
identifying a second virtual server which is operating on a physical computer to which the actual run-use virtual server is allocable and which is relocatable to another physical computer, based on checked and passed environment information of the second virtual server; and
allocating, to the actual run-use virtual server, free resources that are generated by relocating the second virtual server to the another physical computer.

18. The non-transitory computer-readable storage medium according to claim 14,
wherein the processing further comprises, when there is a change in a configuration of the physical computer group,
checking, based on specifics of the change and the checked and passed environment information of the operation check-use virtual server, whether the change is in the physical computers to which the actual run-use virtual server is allocable; and
when the change is in the physical computers, determining that the actual run-use virtual server is a virtual server that is affected by the change in the configuration.

* * * * *